(12) United States Patent
Ross

(10) Patent No.: US 11,678,648 B2
(45) Date of Patent: Jun. 20, 2023

(54) CORAL NURSERY AND PLANTING SYSTEM BASED ON A RING OR WASHER MOUNT

(71) Applicant: Andrew MacKay Ross, St. James (JM)

(72) Inventor: Andrew MacKay Ross, St. James (JM)

(*) Notice: Subject to any disclaimer, the term of this patent is extended or adjusted under 35 U.S.C. 154(b) by 629 days.

(21) Appl. No.: 16/544,560

(22) Filed: Aug. 19, 2019

(65) Prior Publication Data
US 2020/0053988 A1    Feb. 20, 2020

Related U.S. Application Data

(60) Provisional application No. 62/719,345, filed on Aug. 17, 2018.

(51) Int. Cl.
*A01K 61/20* (2017.01)
*A01K 61/78* (2017.01)
*A01K 61/75* (2017.01)

(52) U.S. Cl.
CPC .............. *A01K 61/20* (2017.01); *A01K 61/75* (2017.01); *A01K 61/78* (2017.01)

(58) Field of Classification Search
CPC ........ A01K 61/20; A01K 61/75; A01K 61/78; A01K 63/006
See application file for complete search history.

(56) References Cited

U.S. PATENT DOCUMENTS

| 7,512,326 | B1 * | 3/2009 | Eldredge | ............... | G03B 17/08 |
| | | | | | 396/25 |
| 2003/0111020 | A1 * | 6/2003 | Targotay | ............. | A01K 67/033 |
| | | | | | 119/200 |
| 2005/0022749 | A1 * | 2/2005 | Amblard | .............. | A01K 63/006 |
| | | | | | 119/269 |
| 2012/0096570 | A1 * | 4/2012 | Tran | ..................... | A01K 63/006 |
| | | | | | 119/200 |
| 2017/0196206 | A1 * | 7/2017 | Ross | ..................... | A01K 61/75 |

FOREIGN PATENT DOCUMENTS

| FR | 3068865 A1 | * | 1/2019 |
| KR | 20080081678 A | * | 9/2008 |

OTHER PUBLICATIONS

Calfo, Anthony, Securing Propagated Corals: Methods of Fixing Live Coral to Hard Substrates, 2008, Reefkeeping (Year: 2008).*
Warren, Regon et.al, "Solomon Island Aquarium Farming", Mar. 2011, CRISP (Year: 2011).*

* cited by examiner

*Primary Examiner* — Tien Q Dinh
*Assistant Examiner* — Katelyn T Truong
(74) *Attorney, Agent, or Firm* — Gustavo Marin; Marin Patents LLC

(57) ABSTRACT

A coral ring mount device and method for the propagative culture of sessile benthic marine organisms (for example, stony corals) employing either a ring, washer or threaded nut or similar as a propagule mount upon which the coral is set in order to attach, grow and overgrow within a coral nursery system. In the preferred embodiment of the invention, once the coral is grown onto the ring mount and to its requisite size and condition, the ring mount becomes the washer through which passes a screw to secure the ring and coral to the seafloor.

4 Claims, 17 Drawing Sheets

Fig 1. The ring mount assembly
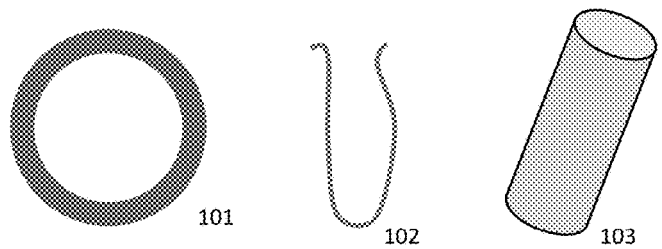
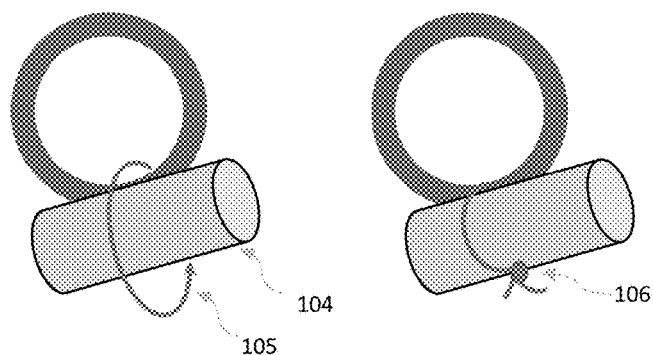
Fig 2. Ring mount attachment to midwater support line
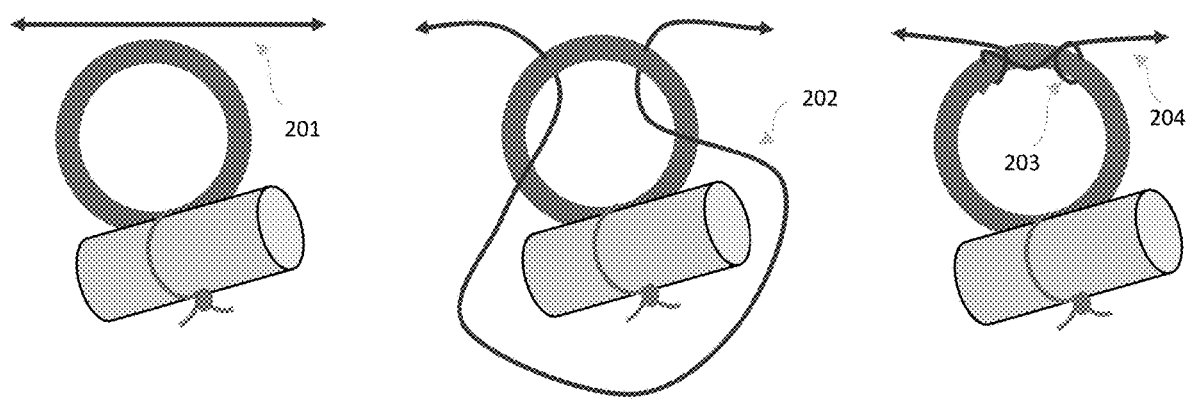

Fig 3. Ring mount attachment to midwater support tensioned line, rod or frame
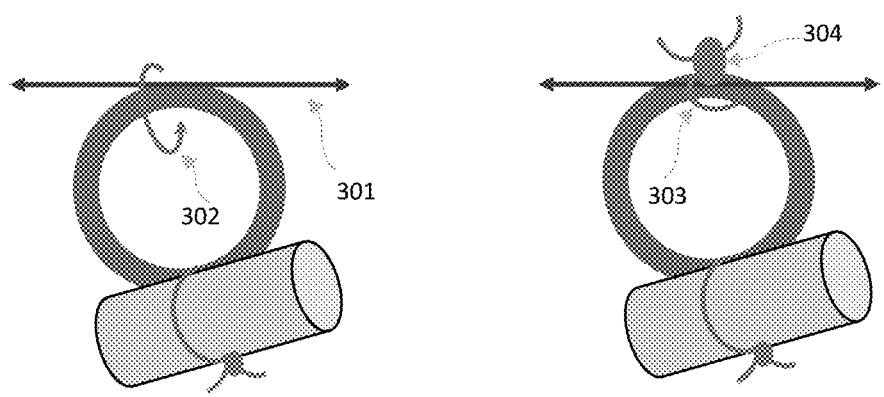

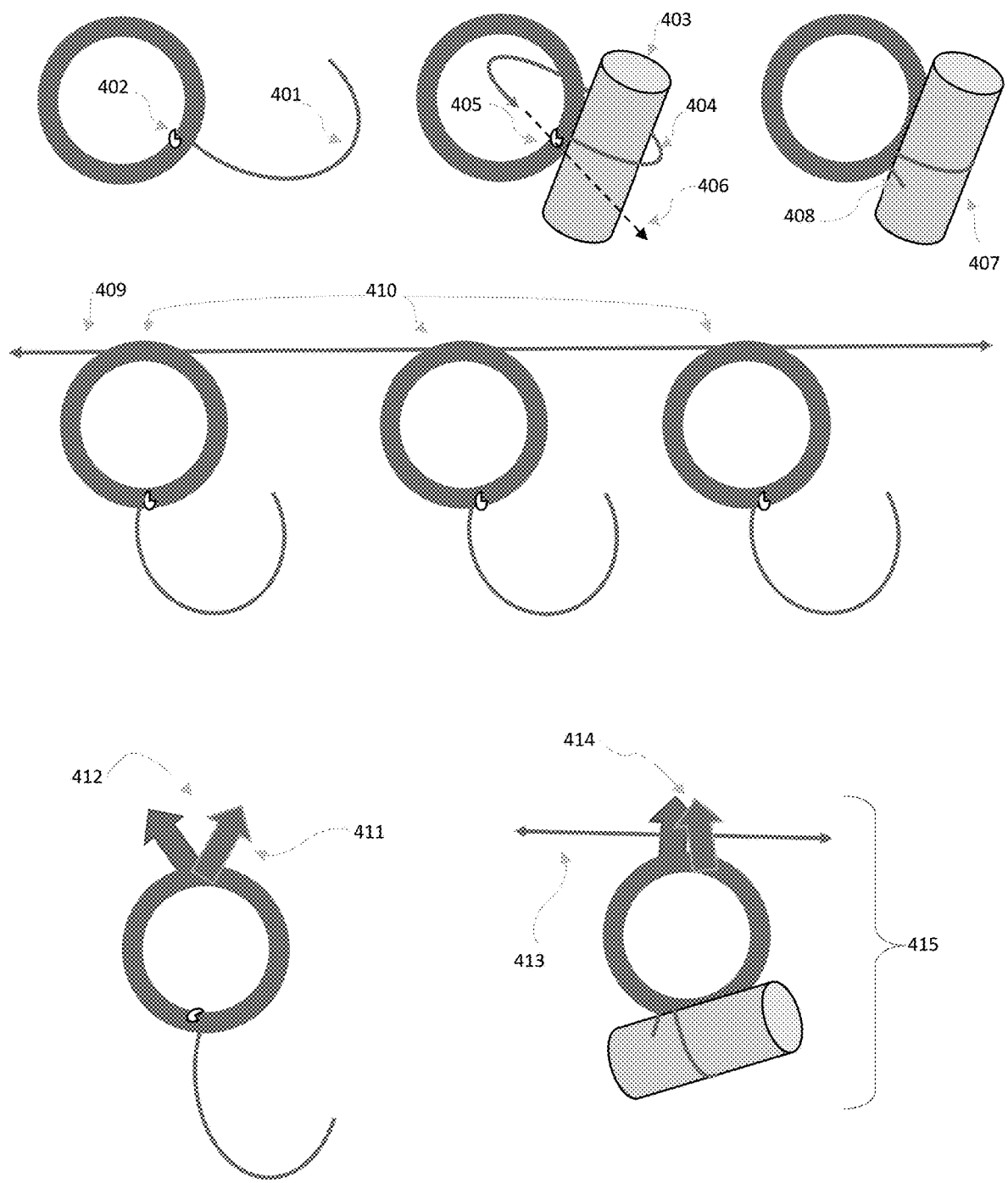
Fig 4. Pre-prepared ring mounts

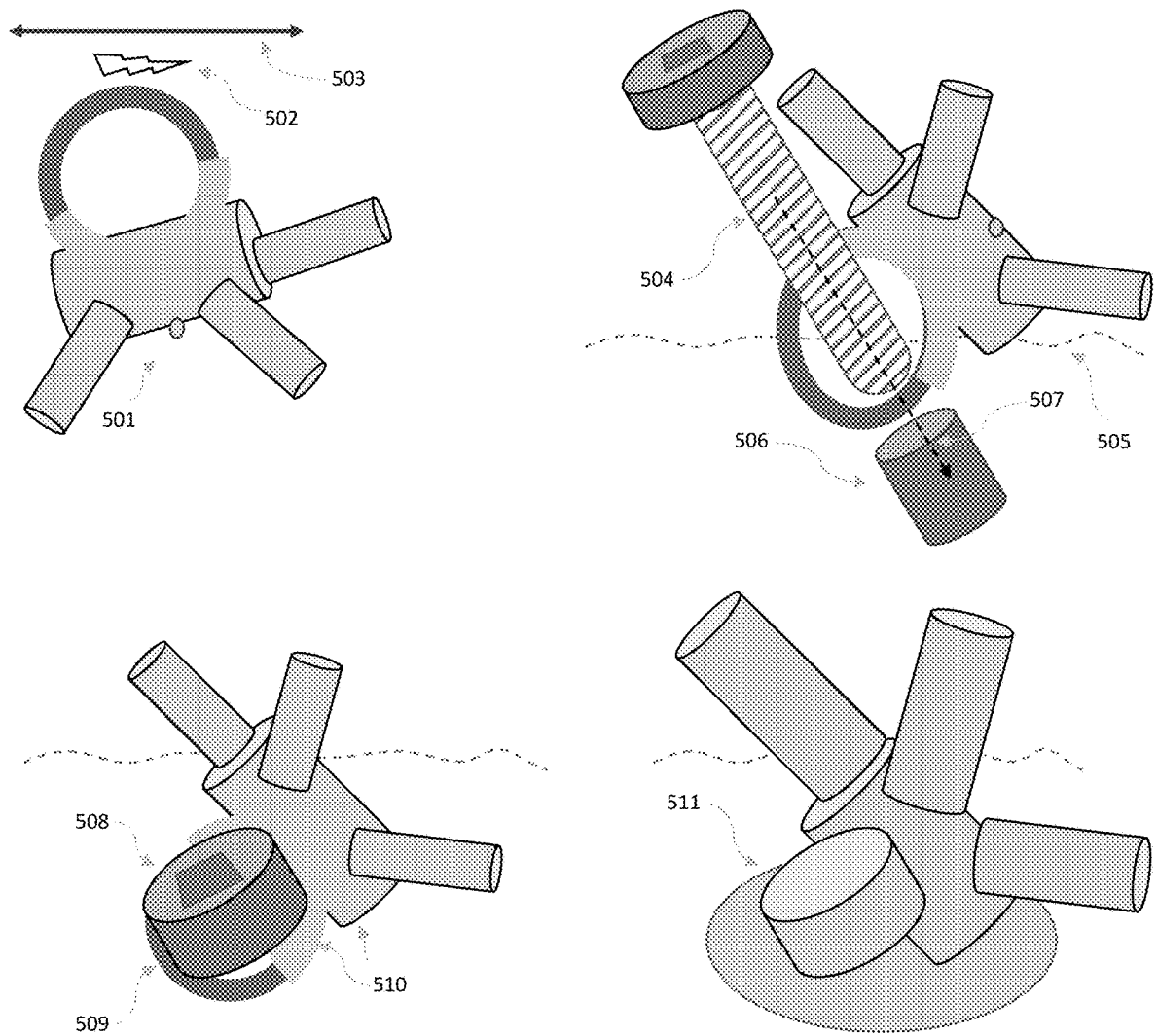
Fig 5. Out-Planting The Ring Mount

Fig 6A. Ring mounts with clasping and stabilizing variations
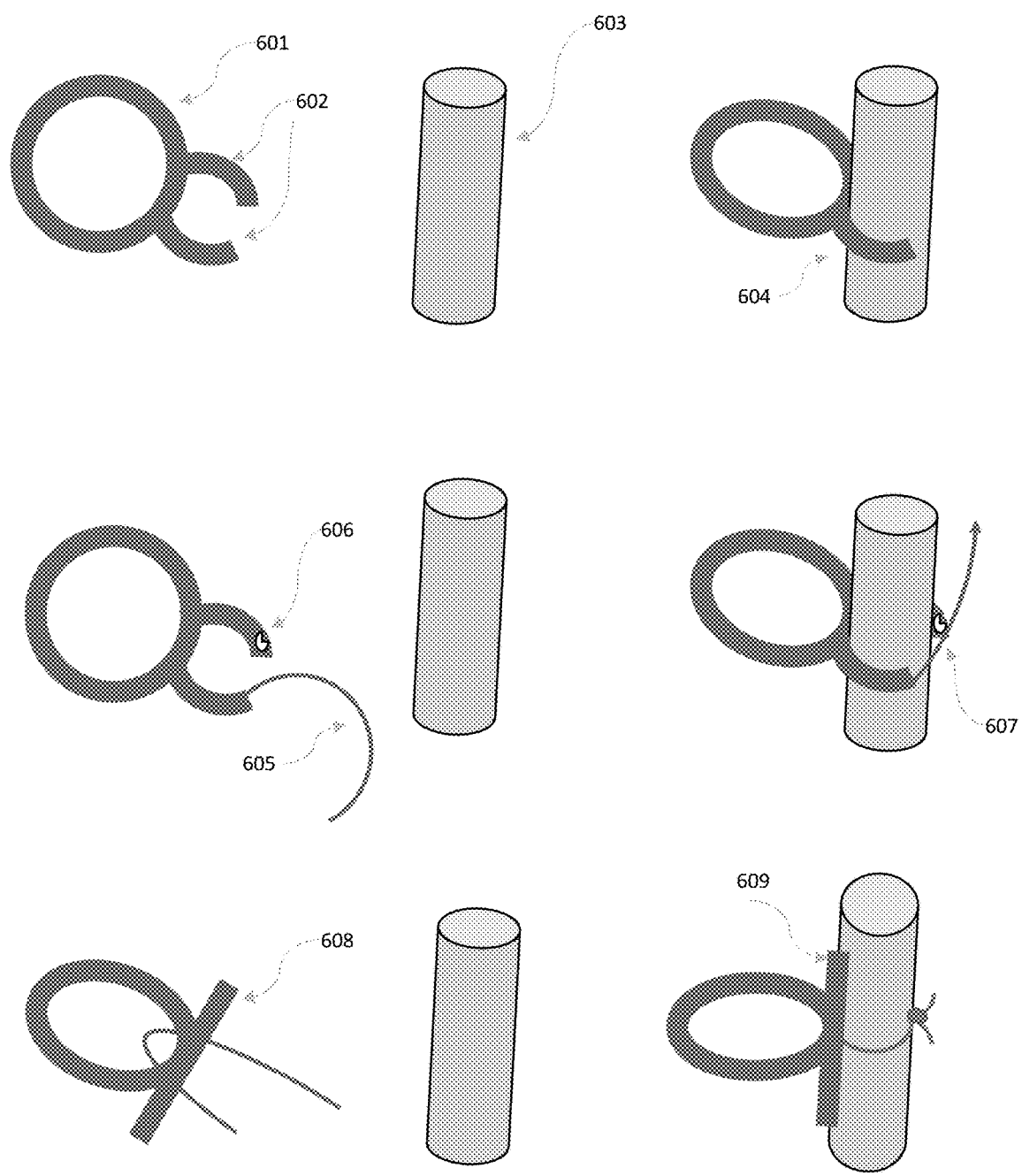

Fig 6B. Ring mounts with clasping and stabilizing variations
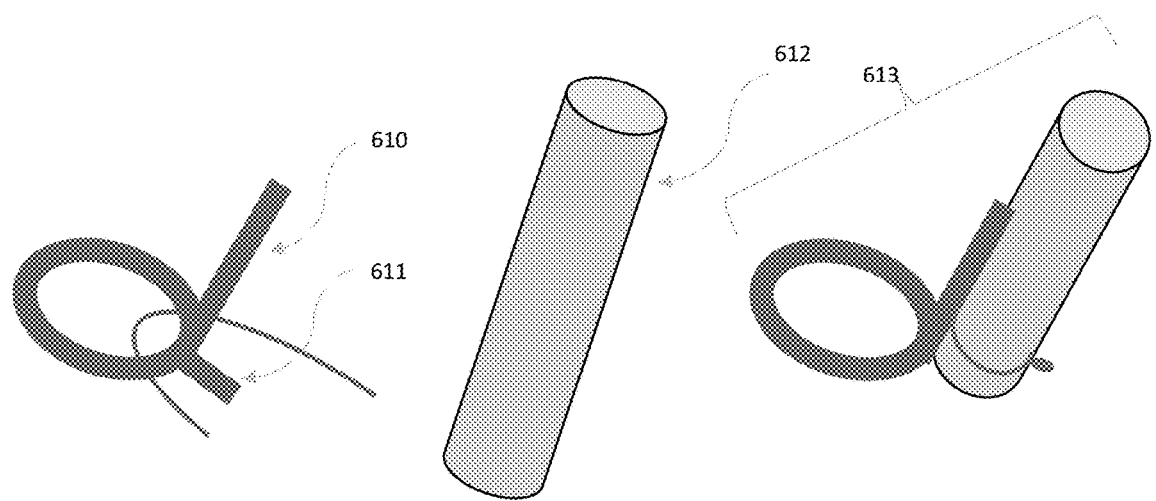

Fig 7. Upright grip mount ring mount variation
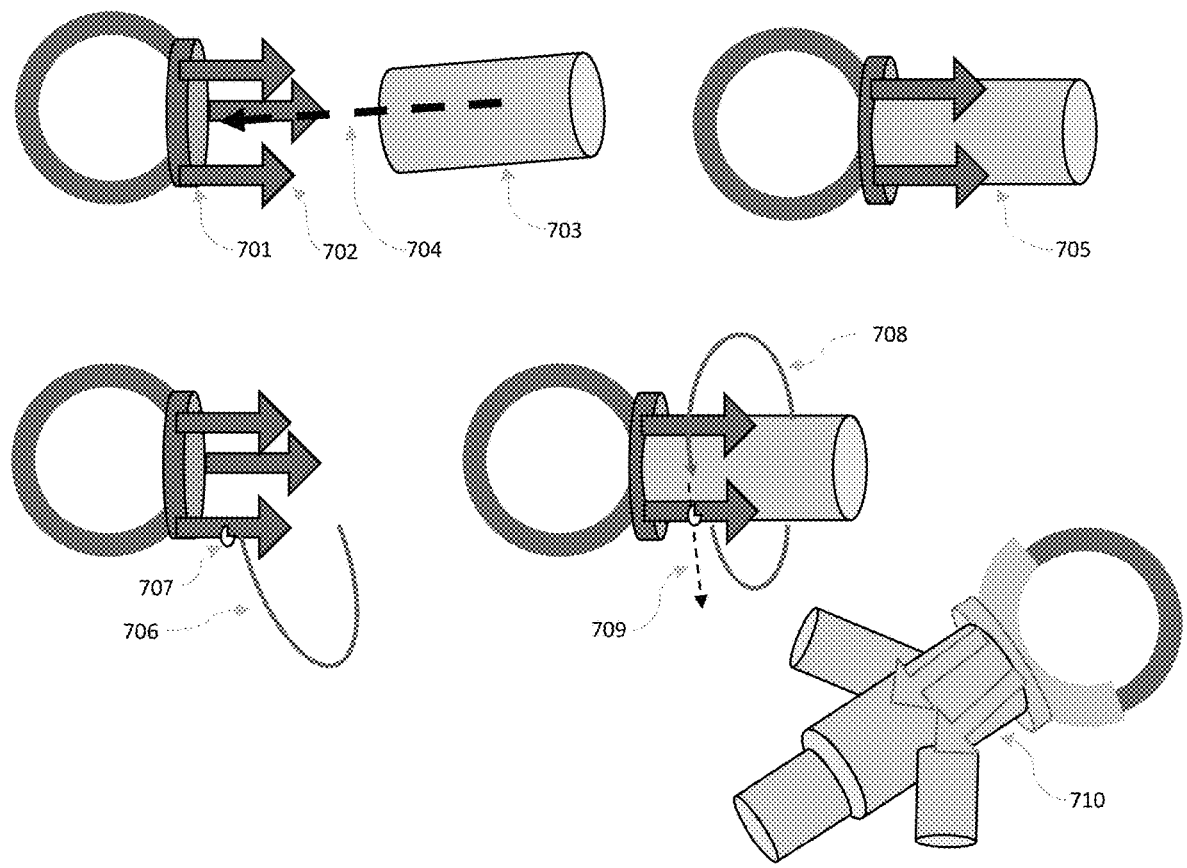

Fig 8. Settled recruit button mount as ring mount variation
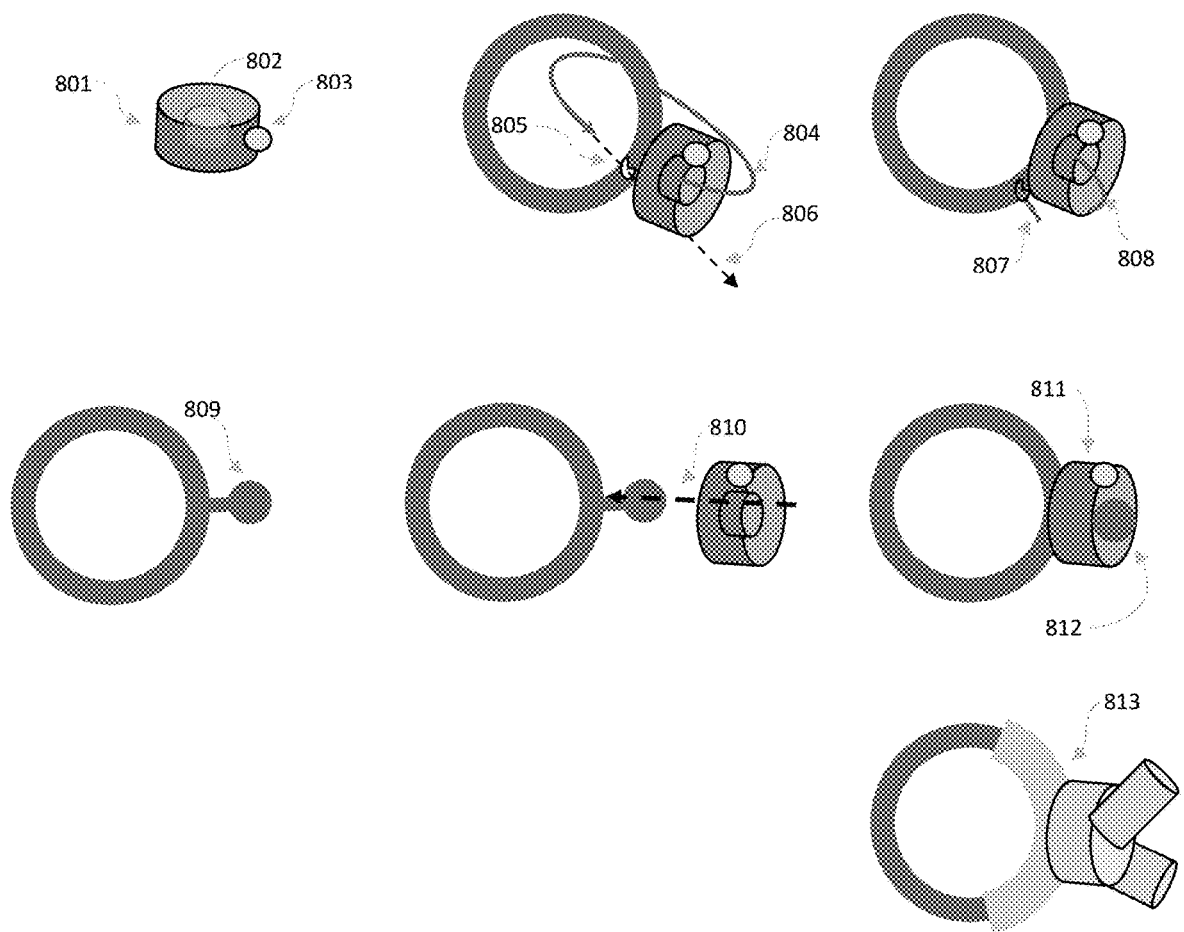

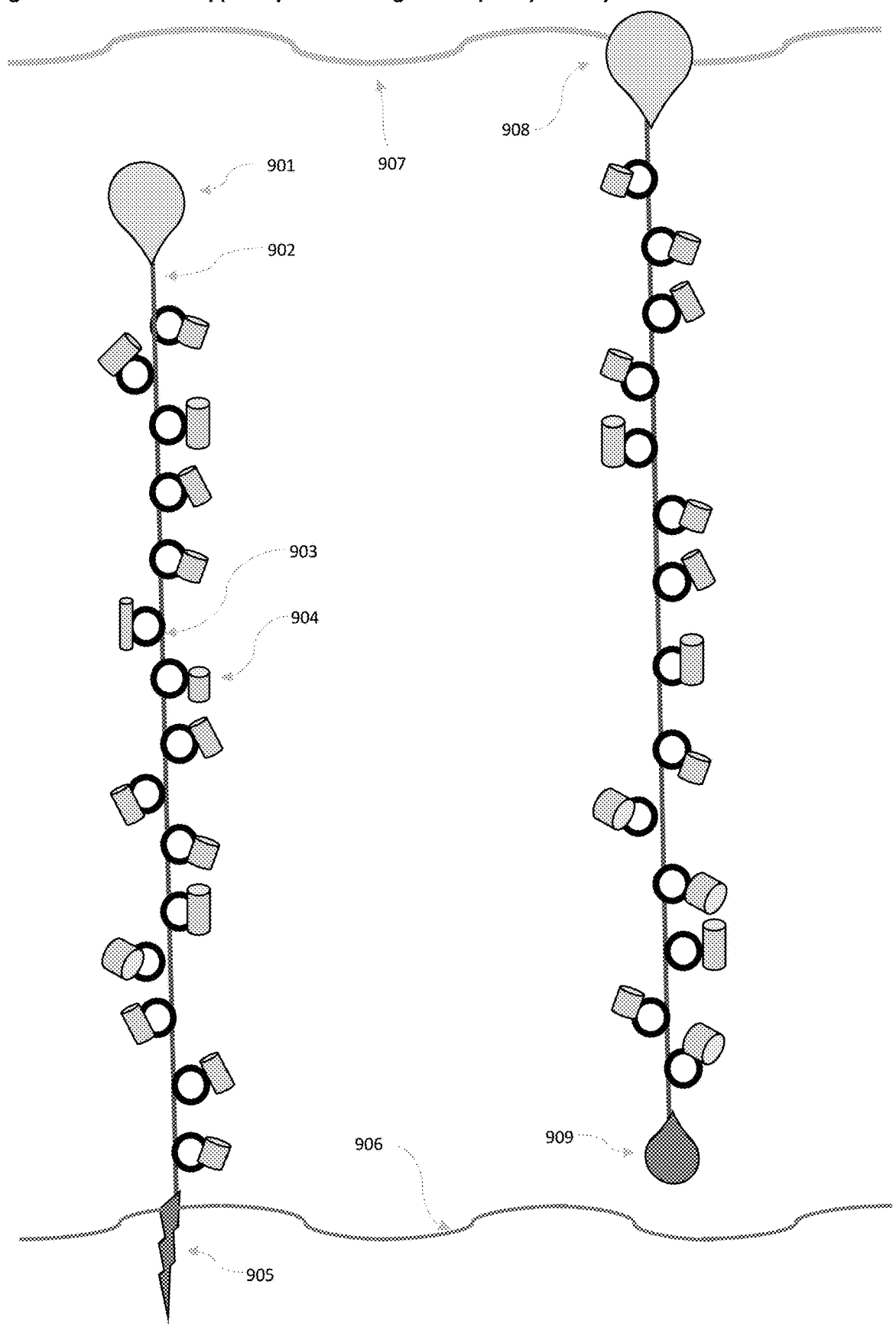
Fig 9. Soft tensioned support system for ring mount (coral) nursery culture Fig 10. Hard tensioned support system for ring mount (coral) nursery culture
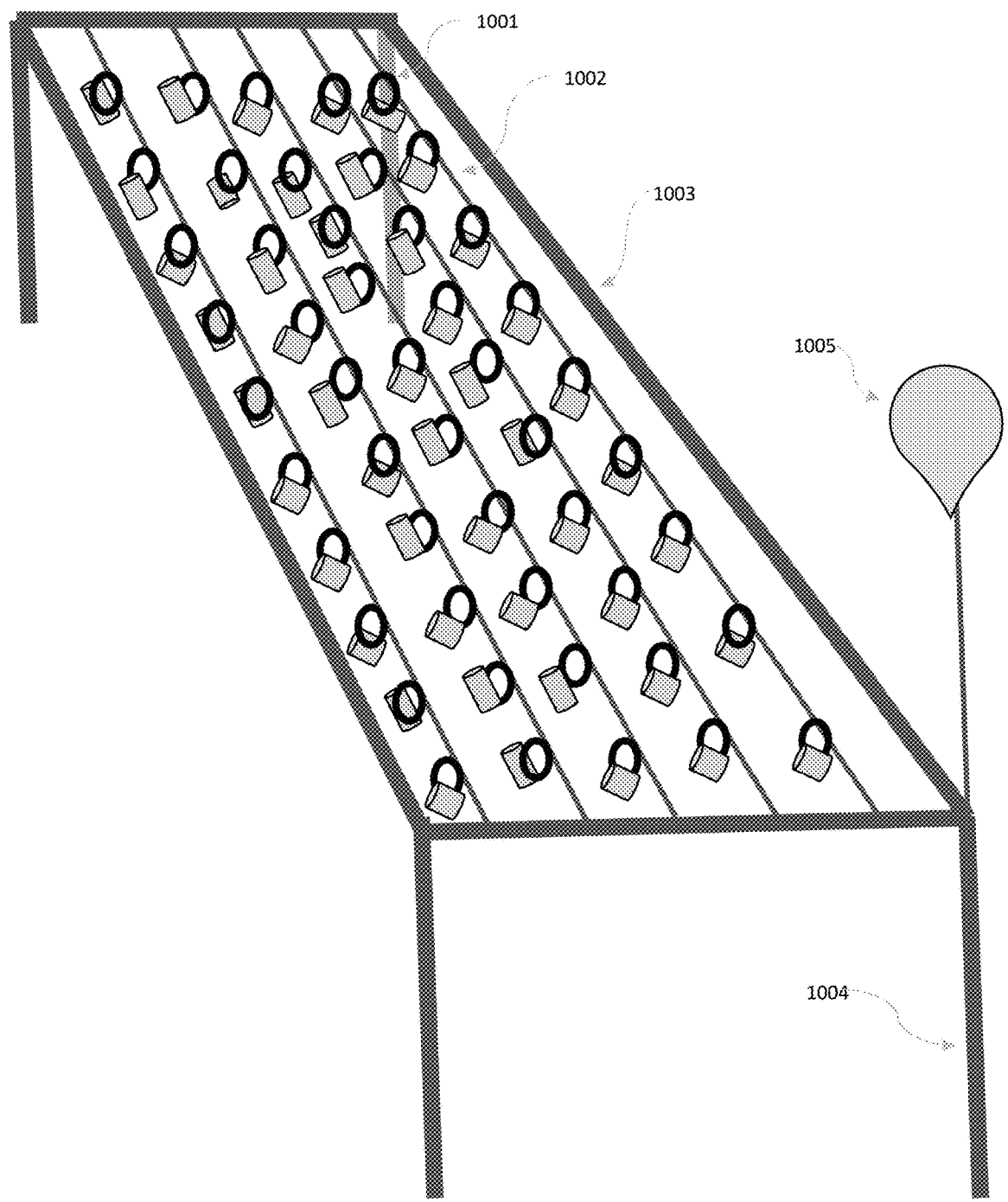

Fig 11A. Ring mounts set to larger and established corals
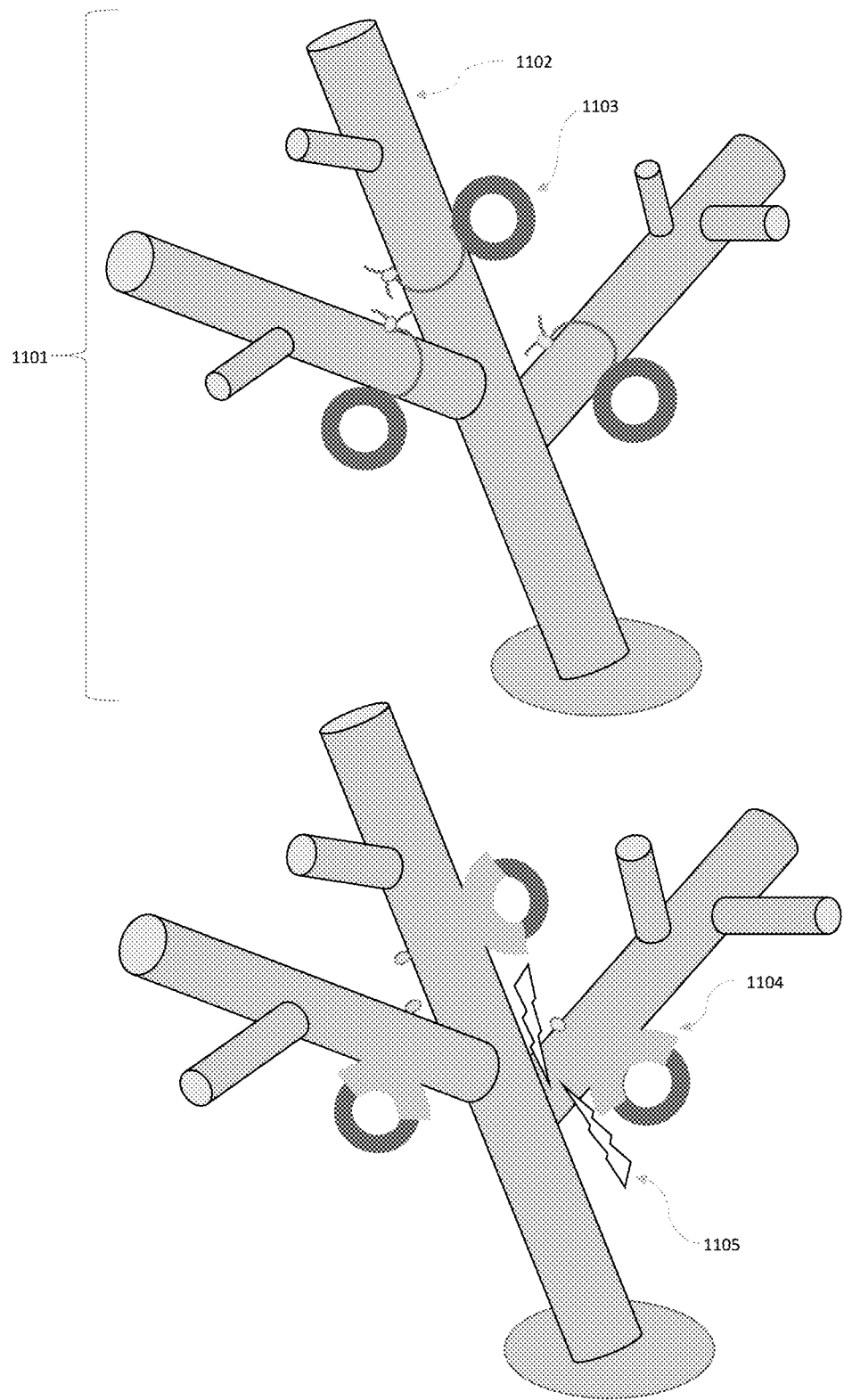

Fig. 11B. Ring mounts set to larger and established corals
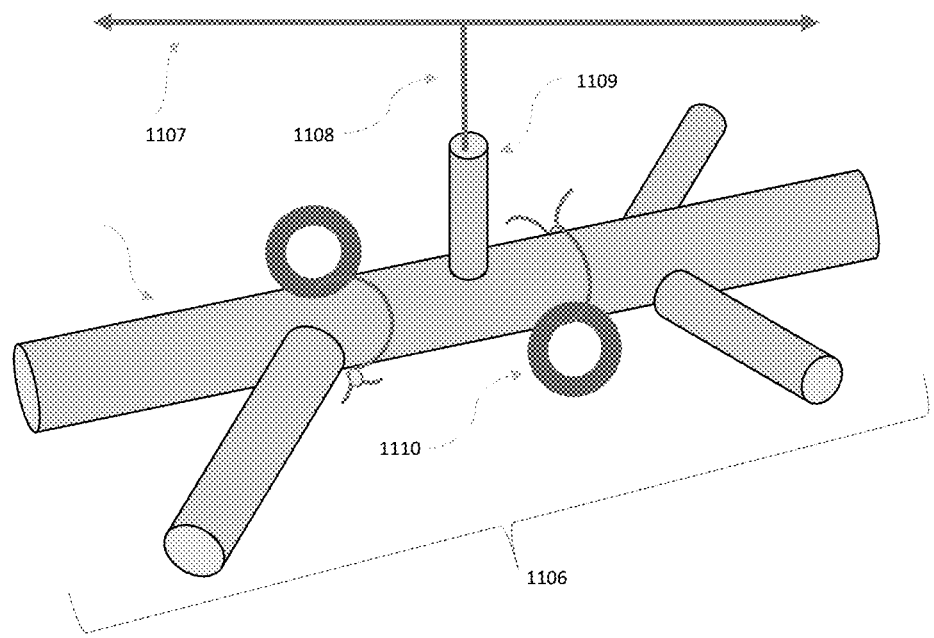
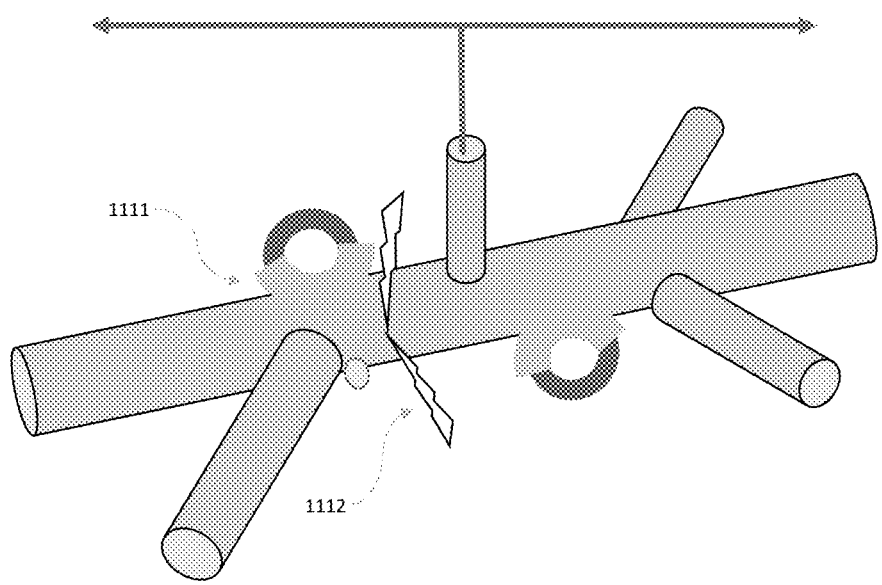

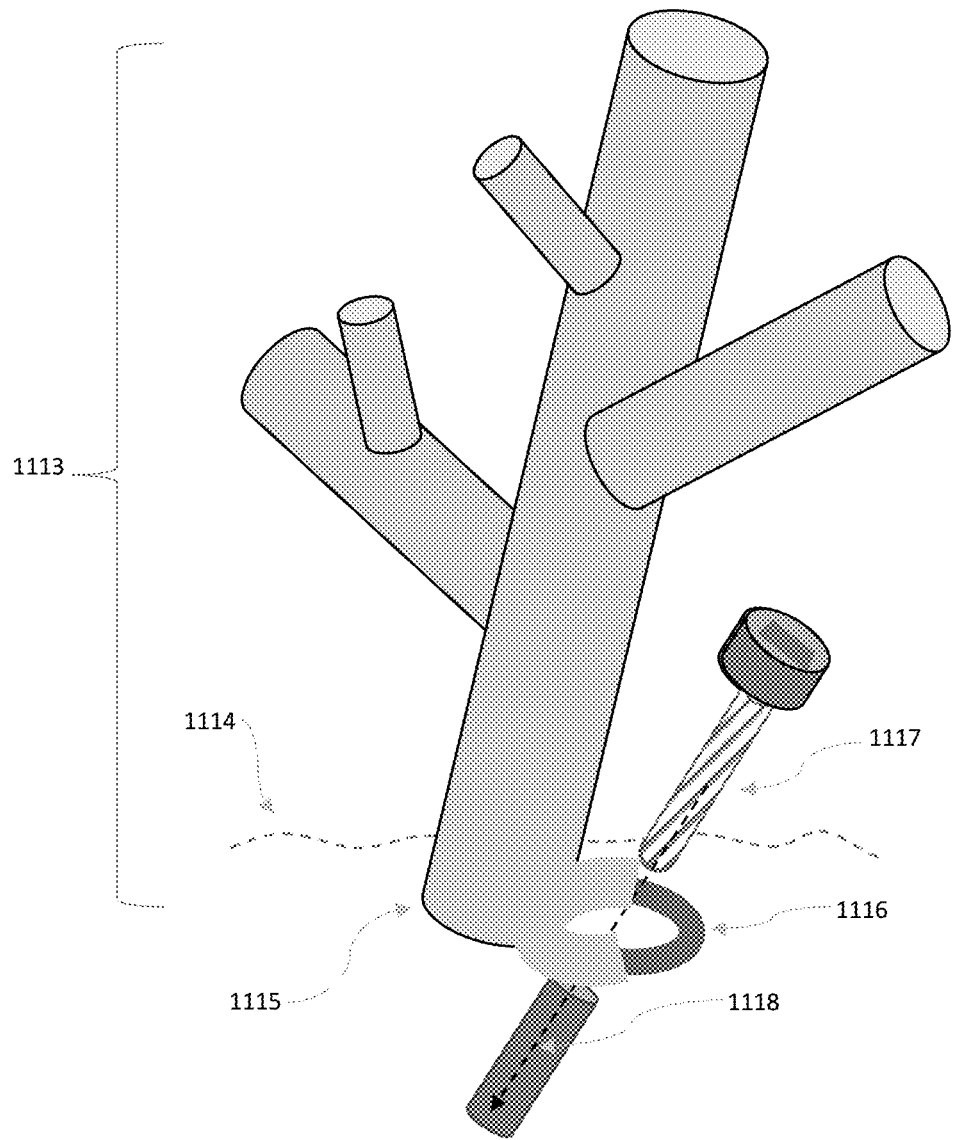
Fig 11C. Ring mounts set to larger and established corals

Fig 11D. Ring mounts set to larger and established corals
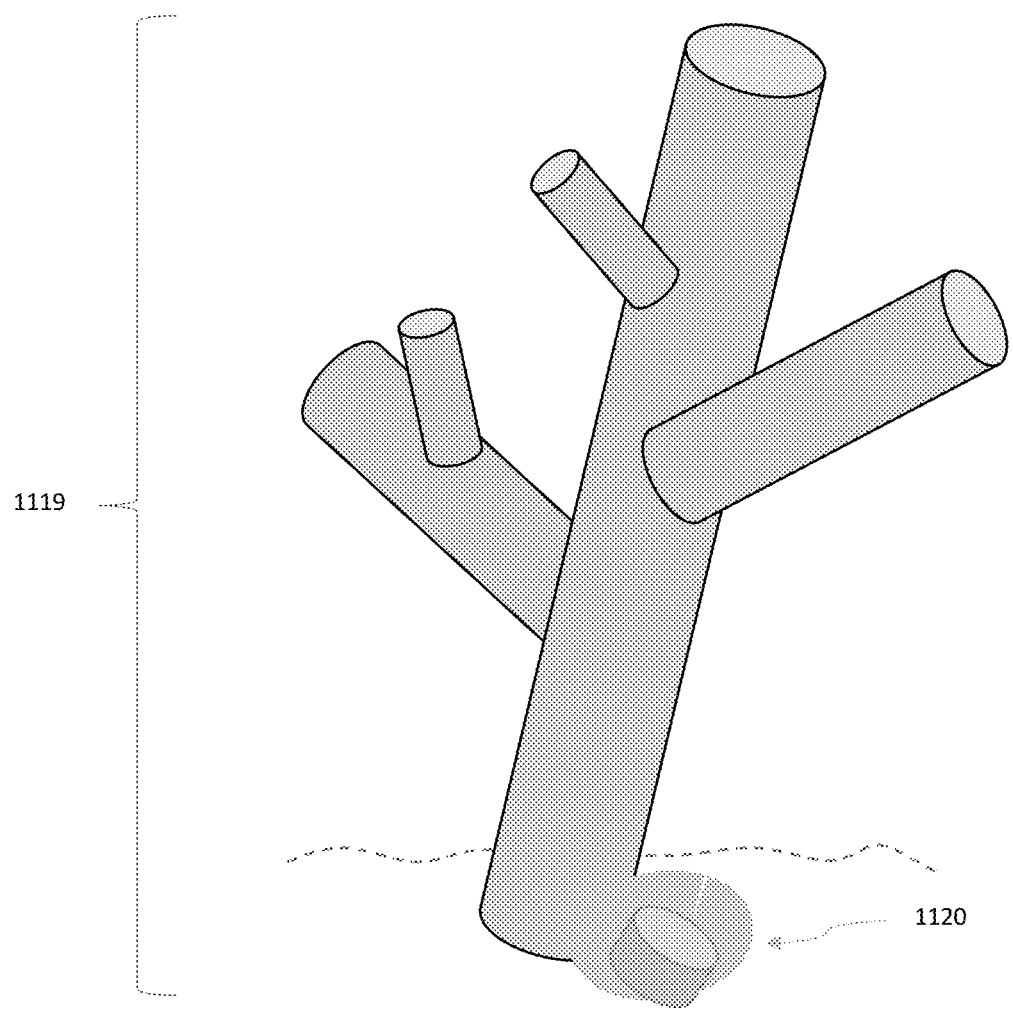

Fig 12A. Ring mounts on supporting bases under table or *ex situ* raceway and tank culture
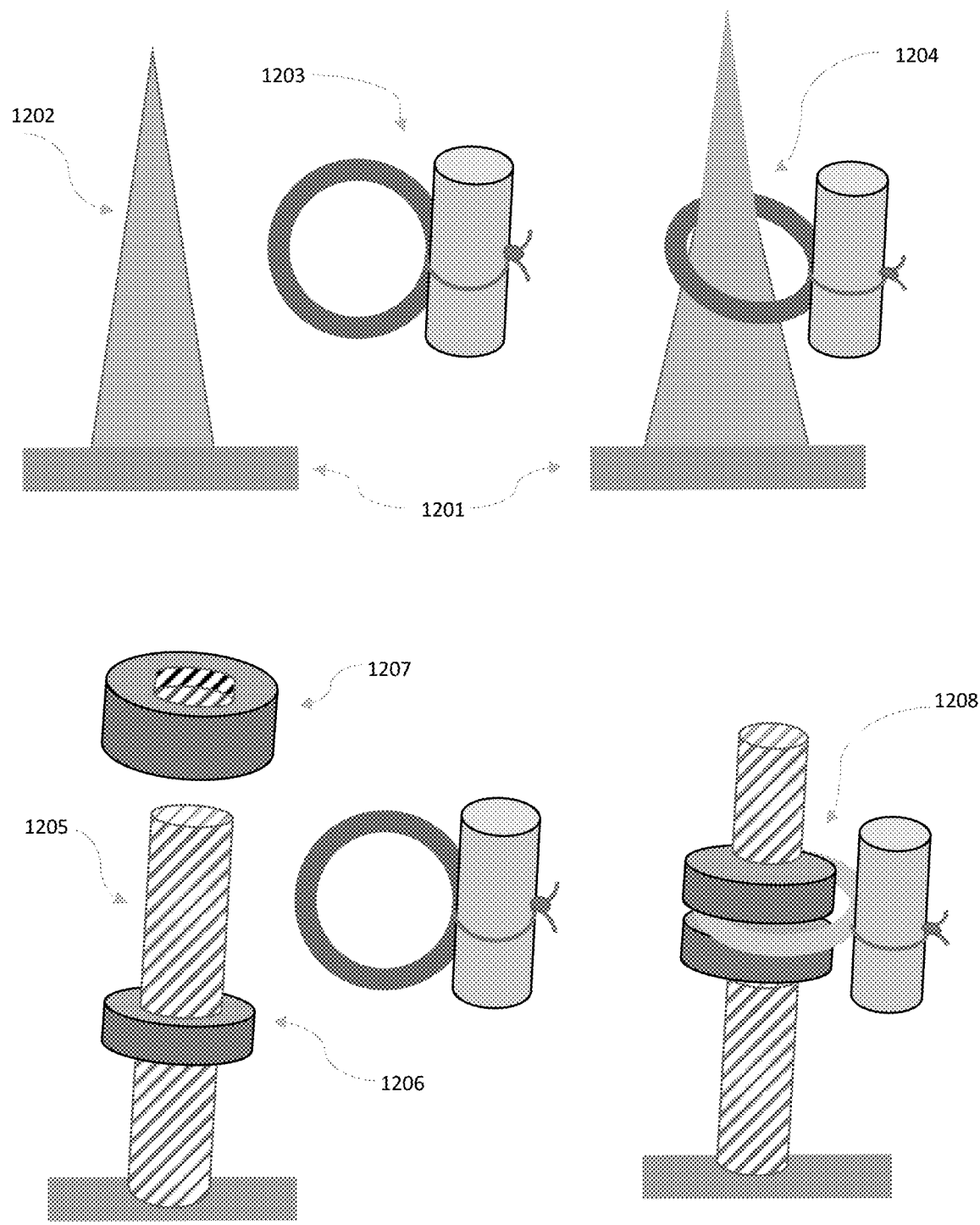

Fig 12B. Ring mounts on supporting bases under table or *ex situ* raceway and tank culture
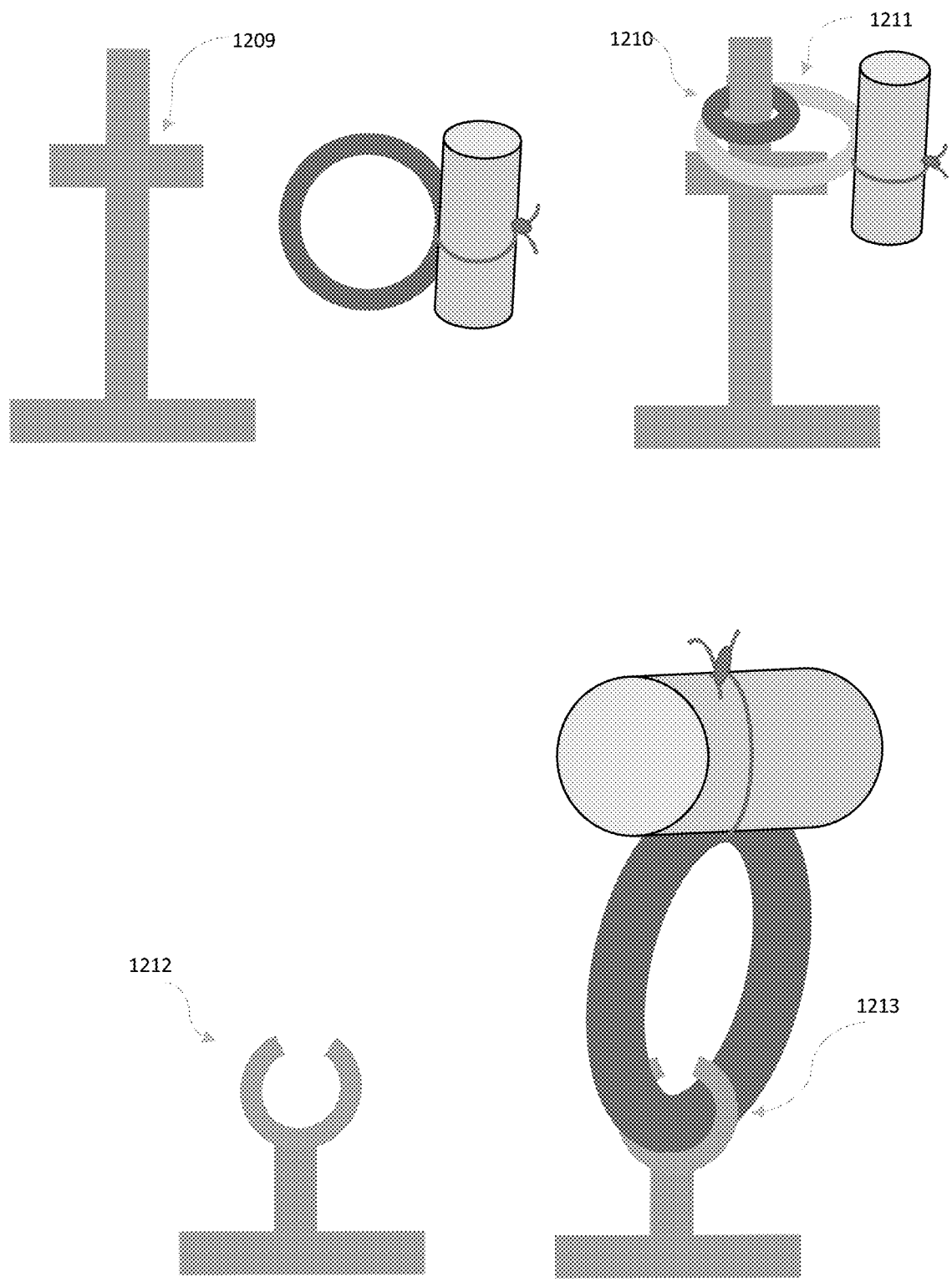

Fig 12C. Ring mounts on supporting bases under table or *ex situ* raceway and tank culture
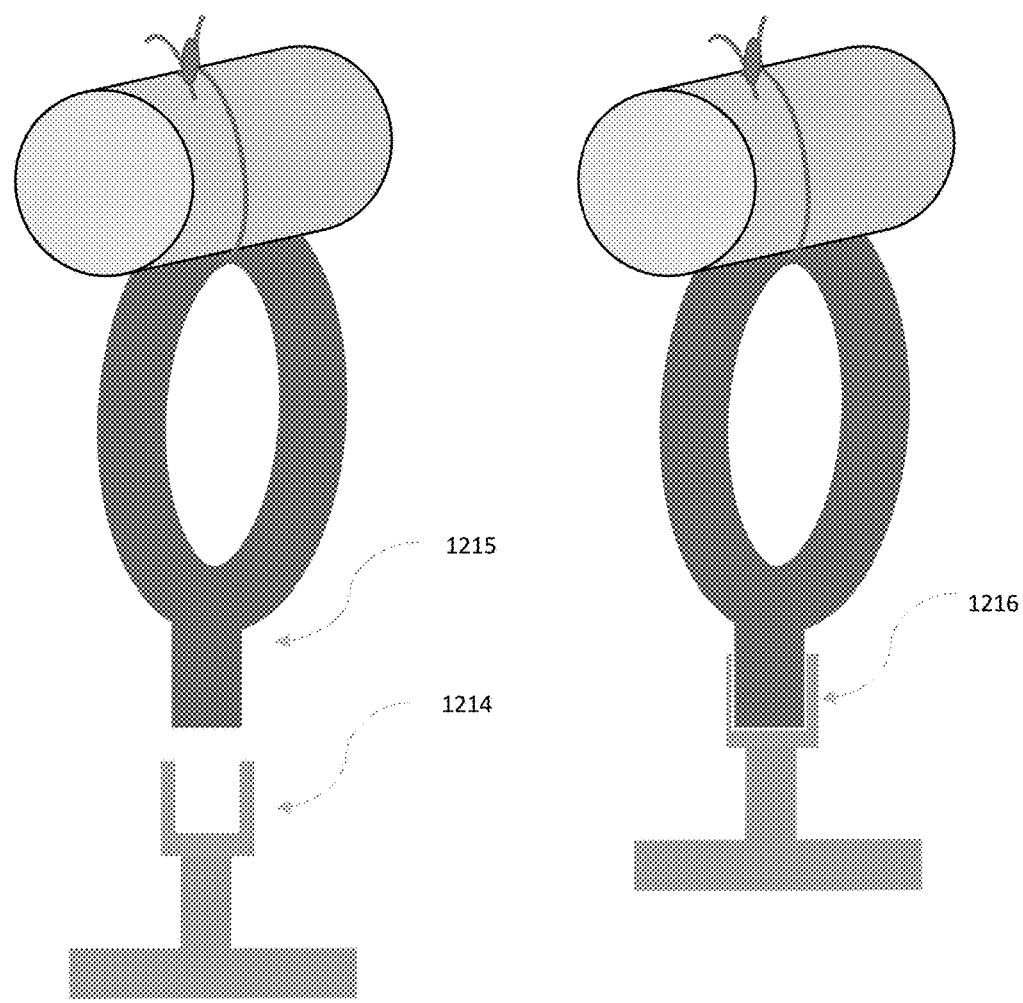

CORAL NURSERY AND PLANTING SYSTEM BASED ON A RING OR WASHER MOUNT

CROSS-REFERENCE TO RELATED APPLICATIONS

This application also claims priority to U.S. provisional application 62/719,345, titled, "CORAL NURSERY AND PLANTING SYSTEM BASED ON A RING OR WASHER MOUNT", filed on Aug. 17, 2018. The entire specifications of each of which are incorporated herein by reference in their entirety.

BACKGROUND OF THE INVENTION

Field of the Art

The disclosure relates to the field of coral reef cultivation, planting and restoration techniques, in particularly to a coral nursery apparatus and its application.

Discussion of the State of the Art

Caribbean mean coral coverage has declined from some 50% to less than 15% since the mid-1970s due to disease and other issues related to human disturbance including overfishing, sewage and other pollutions and physical impacts such as dredging and coastal development. Many reefs of other seas have similarly suffered.

Losses and impacts to ecosystem services related to these corals have included reductions in ecosystem and fishery productivity, beach and coastal erosion and infrastructure damage requiring costly engineering and losses in coastal and submarine aesthetics including tourism draw. Furthermore, upward-growing (coral) reef is vital to mitigating the impacts of sea-level rise related to global climate change. Strong, reproductively functional populations of coral and other reef fauna and flora are vital to long-term adaptability to rising sea conditions of temperature, pH, currents etc. related to increasing atmospheric $CO_2$.

Many sessile benthic marine organisms including hard and soft corals, sponges and the like employ vegetative asexual fragmentation in colony expansion. In this, such organisms readily fracture and reattach to new seafloor or to other. This element of the their natural may be employed in active nursery culture including ongoing re-fragmentation, propagation and replanting for enhancement and restoration under horticultural and forestry themes(i). Active facilitation of spawning and larval settlement may also provide corals of novel genetic lineages for the such vegetative culture, or simply for planting back to the seafloor or structure.

Current methodologies in both the nursery setup and the planting of these cultured organisms rely on knots, nails, cable-ties, cements or adhesives, all of which require dedicated technician capacities and time under stable or calm sea conditions. These disjointed activities greatly limit per-time and per-technician productivity and therein scalability, increase propagule losses including mortalities, and limit the possible locations for planting including to exposed positions for the purposes of wave attenuation. What is needed is a rapid, linearly streamlined system in i) attachment of the propagule to a nursery device, followed by ii) immediate, mechanical attachment of the cultured organism to the seabed via that same device.

What is needed is a simplified and accelerated attachment of propagule to a mounting device, followed by accelerated out-planting with that same mounting device and its coral to the seabed.

SUMMARY OF THE INVENTION

Accordingly, the inventor has conceived and reduced to practice in a preferred embodiment based on a ring or washer device which the coral propagule is affixed, grown and then secured to the seafloor.

According to a preferred embodiment of the inventions, the coral ring mount is a device and method for the propagative culture of sessile benthic marine organisms (for example, stony corals) employing either a ring, washer or threaded nut or similar as propagule mount, here forward referred to as the ring mount, upon which the coral is set in order to attach, grow and overgrow within a coral nursery system. In the preferred embodiment of the invention, once the coral is grown onto the ring mount and to its requisite size and condition, the ring mount becomes the washer through which passes a screw to secure the ring and coral to the seafloor.

In some embodiments, the small coral propagule is affixed to the ring mount with a segment of wire or (fishing) line or with an adhesive. In a preferred embodiment, a segment of fine wire is wrapped around a small ring with two equal length ends left free. The coral propagule is then set between the ring-connection those ends in contact with the ring, and the ends are drawn together over the propagule. The wire ends are twisted until the propagule and ring are secured together. In a further embodiment, a line or cable-tie is passed through the ring and around the propagule, and then tightened until the ring and propagule are secure and immobile. In a further embodiment, a ring is fabricated with a line affixed, with a one-way tightening attachment and tightening point for said line. The propagule is wrapped with the line and the end of the line secured and tightened into the attachment point until the propagule and ring are secured immobile. A further embodiment is a ring fabricated embedded with a wire as per the preferred embodiment. The ends of the in-built wire wrap the propagule and twist at its far side to secure it immobile to the ring mount. A further embodiment provides a flattened, hooked or toothed area on the ring to anchor or otherwise facilitate immobilization of the propagule, or to facilitate use of adhesives. A further embodiment provides a small male snap, button or threaded point protruding from the ring mount to hold a planula settlement button or other propagule holding device.

In a preferred embodiment, the ring mount with its attached coral propagule is set within a loosely tensioned line by passing a loop of said line through the ring, then opening the loop and passing it around the ring again to secure the ring within the line as the line is tightened. In another embodiment, a line or rigid rod will be prefabricated with a plurality of ring mounts along the line's length. In another embodiment, the ring mount may be secured to a nursery line or rod with a knotted line segment, wire, clip, cable-tie or adhesive. In a further embodiment, the support line or rod may be threaded through the ring and the ring secured at a point along said line or rod with a knotted line segment, wire, clip, tie or adhesive. In a further embodiment, a hook and/or securing clip may be incorporated into the ring's structure by which the ring is secured to the supporting device. A single or a plurality of lines or rods may be set as a nursery array within a rigid framework, or one or more lines may be anchored to the seabed and held taught by a mid-water buoy or suspended from above in a vertical deployment. In further uses and embodiments, the ring mount is affixed to corals already growing in other nursery types or to wild corals to facilitate planting or replanting. In further embodiments, the ring may be set over a rigid shaft oriented either vertically or horizontally, including a threaded shaft with threaded nuts, rubber washers or similar providing spacers, or with a threaded nut providing the coral ring mount. A further embodiment may also be a tapered rod holding the ring and propagule at a given height above a substrate, particularly within ex situ raceway culture or within various benthic, table or mid-water buoyant support frameworks.

The preferred embodiment in coral out-planting from the nursery is through drilling a hole into hard substrate, setting the ring to this hole and passing a masonry screw through the ring and into said hole. The screw is then tightened down to secure the ring (as a washer), holding the coral against the planted substrate: an improvement over systems known in the art. In other embodiments, a naturally occurring hole in the reef may negate drilling a hole. In other embodiments, a threaded rod may be secured into said substrate hole and a threaded nut employed to secure the ring mount and coral. In such an embodiment the nut may be the ring mount. The threaded rod or nut may be set or pre-set to an artificial reef structure for the ring mount and coral to be secured with a threaded nut or bolt. In further embodiments, a spike with threaded top may be set or driven into the seafloor and ring mount and nursery-derived coral secured thereto. A further embodiment again may employ a nail or staple securing the ring to the reef, or a tie, wire wrap or tightly knotted line securing the ring mount to a natural projection in the reef or to a set nail. A further embodiment may employ cement or adhesive to secure the ring mount and coral to the reef.

According to the embodiment, by using simplified and streamlined materials and set-up, rapid live propagule attachment, high-survivorship and high-growth followed by a streamlined, rapid and immediately secure planting process suggests particular cost savings allowing increases in programmatic scale. This device allows the application of a silvicultural mindset to marine species and ecosystem enhancements and/or restorations.

BRIEF DESCRIPTION OF THE DRAWING FIGURES

The accompanying drawings illustrate several embodiments of the invention and, together with the description, serve to explain the principles of embodiments of the invention according to the embodiments. It will be appreciated by one skilled in the art that the particular embodiments illustrated in the drawings are merely exemplary and are not to be considered as limiting of the scope of the invention or the claims herein in any way.

FIG. 1 is an illustration of an exemplary embodiment of the inventions base elements, and (coral) propagule attachment the (coral) propagule to the ring mount by wrapping the wire, line or cable-tie through the ring and around the propagule and tightening to secure the ring and propagule together into a ring mount assembly or planting unit.

FIG. 2 illustrates and exemplary embodiment of the invention attaching the ring mount assembly to a support line under light or adjustable tension. A loop is made in the line and threaded through the ring (mount) and drawn over the ring mount assembly. Tension is then returned to the line to draw the loop tight around the ring (mount), holding the ring mount assembly securely. In a similar embodiment of the invention, the ring mount may be set to the support line and the (coral) propagule set to this ring afterwards. Within a further embodiment, the propagule may be set between the empty ring mount and the tensioned loop, to be held to the ring mount by the line under tension. In any such embodiments, the supporting line or wire may be in a vertical, horizontal or other configuration.

FIG. 3 illustrates and exemplary embodiment of the invention which attaches the ring mount assembly to a pre-tensioned line, wire or to a rigid rod using a segment line or wire, a cable-tie or similar. Within such an embodiment, the ring may be set to the support line/rod with the propagule set to the ring afterwards. Unillustrated embodiments may include use of adhesives at any of the attachment points or threading the support line/rod through the ring and securing from the inside rather than the outside. In any such embodiments, the supporting line or wire may be in a vertical, horizontal or another configuration.

FIG. 4. is an illustration of an exemplary embodiment of prefabricated versions of FIGS. 1 and 2, wherein the propagule and/or support attachments are integrated into a ring mount. In the initial embodiment, a propagule attachment line or wire is pre-fabricated as part of the ring mount, and within the ring mount is a tapered, toothed or ratcheted groove or perforation through which the pre-set line passes to make a loop containing the propagule. That loop wraps and is pulled tight to secure the propagule. An embodiment of the invention not illustrated is a ring mount with paired wires emanating from the ring mount to be wrapped and twisted to secure the propagule. The line/tie or the wire embodiments may be oriented parallel or perpendicular to ring mount to facilitate various coral morphologies and growth or morphological intentions. A further embodiment pre-sets several ring mounts along a line or rod. A further pre-fabricated embodiment includes a hook and/or clip device at the opposite end of the ring mount to the coral attachment point, with said hook and/or clip device securing the ring mount assembly to the supporting line, wire or rod.

FIG. 5 is an illustration of an exemplary out-planting process for prepared, grown (coral) material. The matured ring mount assembly is detached from the support line, wire or rod and a hole is drilled into the to-be-planted structure or substrate, usually native reef. An appropriate screw is then set through the ring and into the drill-hole and tightened to secure the screw and ring mount assembly, as per a screw and washer analogy. The secured coral then overgrows the seafloor in self-attachment and renewed growth, according to an embodiment of the invention.

FIGS. 6A and 6B are a series of illustrations of variation to the ring mount for various embodiments of the invention, including a ring mount with a crescent attachment point that may pinch a cylindrical coral morphology, and a ring mount with a stabilizing rod intended for larger propagules including of an intended growth direction. Such embodiments may secure the propagule to the ring mount as per the above secondary and/or pre-fabricated embodiments. Such embodiments may be oriented in any configuration to the ring mount according to the intended propagule or planted coral morphology.

FIG. 7 is an illustration of an exemplary press-grip and/or tightening wrap propagule attachment points for the ring mount. Unillustrated embodiments include a simplified biaxial braid (towing sock) of woven filaments and downward tightening tab in lieu of the barbed pins. Unillustrated embodiments include a single barbed or male-threaded central spear to be inserted and secured into a small hole drilled into the propagule.

FIG. 8 is an illustration of an exemplary use of the ring mount to secure and grow very small propagules or settled larvae via a settlement snap, by threading the snap's through-hole through the ring mount line or segment to secure it as per the previous embodiments of the invention. A preferred embodiment uses a ring mount fabricated with the self-securing through-press barbed or threaded button for said settlement snap.

FIG. 9 is an illustration of an exemplary soft-tension system in a vertical orientation based on a float anchored mid-water providing tensioning positive buoyancy, according to an embodiment of the invention. An alternative orientation of this vertically oriented example may include a weighted line suspended from a buoyant or stilted framework, or a dock.

FIG. 10 is an illustration of an exemplary hard-tension system wherein the support lines with or previous to setting ring mount assemblies are tied taught into a rigid structural frame. A further embodiment may employ wires or rigid rods rather than taught lines, or a wire framework. The structural frame may be oriented vertically or horizontally. It may be suspended from the surface or mid-water under buoyancy or elevated atop supporting legs. Further embodiments may employ any of the ring mount assembly embodiments. Embodiments of this invention may occur within outside of the sea under raceway, tank or aquarium culture.

FIGS. 11A, 11B, 11C, and 11D are illustrations of the use of the ring mount in facilitation of re-planting of established corals either wild, or within this or another form of nursery culture, particularly drop-attachment suspensions. In such an embodiment of the invention, the ring mount is secured to the coral and the coral is allowed to overgrow it, securing the ring mount into its tissues and skeleton. The coral portion with secured ring mount is then excised from the coral and secured to the intended planting substrate.

FIGS. 12A, 12B, and 12C are illustrations of embodiments of the invention supporting the ring mount assembly in a fixed or rigid table assembly either undersea or in raceway, tanks or aquarium cultured outside of the sea.

DETAILED DESCRIPTION

The inventor has conceived, and reduced to practice, coral nursery and planting system based on a small ring or washer affixed temporarily to an elevating support device.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural or other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

FIG. 1 illustrates an exemplary embodiment of a fragment-to-ring mount attachment using a short segment of line or wire to wrap and secure a (coral) propagule or fragment for nursery growth. According to the embodiment, the affixing wire/line 102 is passed through the ring mount 101 and around the (coral) propagule 103 and wrapped tightly 105. The wire or line is then twisted or knotted and tightened around the propagule until the propagule is secure and immobile in reference to the ring mount 106 as the ring mount assembly. The terms ring mount assembly and planting unit general terms for the embodiments of the invention wherein the ring mount and coral are secure together, particularly under the intention that the coral material securely overgrow this assembly, as per 501, 710, 813, 1104, 1111, similar and unillustrated embodiments of the invention.

FIG. 2 illustrates an exemplary embodiment in securing a ring mount assembly to a loosely or variably tensioned line. The line 201 is looped and said loop passed through and over the ring mount assembly 202. As tension is then returned to the loop, the loop tightens around the ring mount of the ring mount assembly 203, securing it into the line 204. A plurality of ring mount assemblies may be set to a line.

FIG. 3 illustrates an exemplary embodiment in securing the ring mount assembly to a pre-tensioned line, wire or rigid rod using a secondary attachment device. The ring mount is set against the tensioned line, wire or rigid rod 301 and secured with a wrapped segment of wire or line or a cable-tie or similar 302, which is tightened through pulling, twisting or a knot 304 to secure the ring mount into place within the tensioned line, wire or rod. The support line/rod 301 may be passed through the ring prior to securing 304. A plurality of ring mounts with or without propagules may be set to a line, wire, rod or within a supporting mesh in this embodiment of the invention.

FIG. 4 illustrates an exemplary embodiment wherein the ring mount is fabricated with a pre-set attachment line/wire with or without ratchet teeth 401 and a pre-set groove, hole or perforation in the ring mount body with or without ratchet teeth, catches, taper or similar one-way or tightening holdfast 402. The propagule is held to the ring mount 403 and wrapped tightly with the pre-set attachment line 404. The line is then passed through the self-tightening hole 405 and drawn tight 406 to secure the propagule 407 as the ring mount assembly. The end of the attachment line may then be cut away 408. Unillustrated embodiments of the prefabricated embodiment include a pre-set wire to wrap and twist-tight the propagule have been noted previously in this document (Paragraph 20). A plurality of such ring mount assemblies and/or ring mounts may be set to a line, wire or rod. A further embodiment to this invention fabricates a line 409 of a plurality of ring mounts 410. A further embodiment to this invention fabricates the ring mount with a hook and/or clip device 411, 412 for securing 414 the ring mount assembly to the supporting line, wire, rod 413, 415.

FIG. 5 is an illustration of an exemplary out-planting process. The ring mount assembly having overgrown much of its ring mount and/or otherwise matured 501 is removed or detached 502 from the support line, wire or rod 503. A hole 506 is drilled into a planting structure or substrate, usually the seafloor 505. In alternative embodiments, existing holes in the substrate may be employed, either naturally occurring or pre-set into an artificial substrate including threaded holes or nuts. A screw of appropriate size 504 is set through the ring mount and into the hole 507. The screw is then tightened into the hole 508 to secure the ring mount-coral assembly immobile to the planting substrate 509 and the living (coral) material contacting the substrate 510 in this embodiment. The planted coral then overgrows the screw, ring and substrate in continued growth 511.

FIGS. 6A and 6B are illustrations of variations to the ring mount to secure or further stabilize the propagule including larger and of various morphologies. In the first illustrated embodiment, the ring mount 601 is fabricated with a semi-circle or springing enclosing crescent element 602 oriented to the ring mount according to the morphology of the intended propagule. The crescent elements are then set to grip the propagule 604 to form the ring mount assembly. Further embodiments of these variations may include pre-set line 605 and locking through-perforation 606 elements to secure the propagule 607. Pre-set wrapping wires or barbed or hooked ends to the crescent elements represent unillustrated embodiments to the invention. A further embodiment to the invention is a ring mount rigidity element 608 that, when set oriented according to 609 and overgrown within the ring mount assembly, provides further rigidity to the coral, particularly larger corals. The rigidity element may be oriented to the ring mount according to the morphology of the intended coral including larger and mature corals. This is extended to corals of a single intended growth orientation or larger propagules 612 by a single direction of supporting element 610, possibly to include a foot element at base 611 for a better stabilized larger planting unit with a top and bottom 613.

FIG. 7 is an illustration of an exemplary press-grip and/or tightening wrap propagule attachments for the ring mount, including a base plate 701 supporting a plurality of inwardly barbed 702 stalks. The (propagule 703 is pressed 702 within the barbed stalks until it abuts the based plate. The barbs are therein pressed outwards against an inward tension to secure the propagule 705. The barbed stalks may be secured with a segment of wire or line, as exemplified in the figure as a pre-set securing line 706 with locking through-perforation 707, as per previous embodiments. The line is tightly wrapped around the propagule and barbed stalks 708 and through the locking perforation 709, securing the propagule within the stalks and against the base plate to form the ring mount assembly. The propagule therein overgrows the barbs, rods, attachment line and a portion of the ring mount 710.

In a further unillustrated embodiment, the press-grip or tightening wrap may be set to a clipped or branch end of a mature wild or nursery-held coral.

FIG. 8 represents an exemplary use of the ring mount to secure and grow a planular settlement snap 801, the snap being a device for the settlement, attachment and preliminary growth of coral larvae and very small coral propagules 803 under nursery culture. In the upper illustrated embodiment, the ring mount with pre-fabricated line and locking perforation has its line threaded 804 tightly through the settlement snap's through-hole 802, around or through the ring mount perforation 805 to be tightened and secured immobile 808. The ends of the attachment line or wire are then clipped away 807. In the preferred embodiment of the lower illustration, the ring mount is fabricated with a male settlement snap button 809 over which the settlement snap's through-hole 802 is pressed 810 with a securing "snap" 812 as the secured snap and its pre-settled juvenile coral 811 as the coral mount assembly. The juvenile coral matures in nursery to overgrow the button or attachment line, the snap and a portion of the ring mount 813 in preparation for planting.

FIG. 9 is an illustration of an exemplary soft-tension ring mount coral nursery system in a vertical orientation. A float 901 tethered mid-water against a benthic/substrate 906 anchor 905 provides a soft tension to the structural line 902, to which one or several ring mounts or ring mount-coral assemblies 904 are attached, in this illustrative embodiment via a tensioned through-loop 903. An alternative within this vertically oriented embodiment may have a structural element or (surface) buoy 908 providing an anchor to a negatively buoyant mass 909 to provide the soft tension in the line. Alternate embodiments with a rigid rod or wire at 902 may employ secondary ties at the wire/rod attachment 903 or prefabricated line-ring mount assemblies, as per FIG. 4.

In some embodiments, the support element 809 may be provided by a buoyant bar, boat, barge or dock or similar structure or a vertical line set taught between such structures. Such as system may support a plurality of nursery lines, wires or rods.

In some embodiments, a rigid spacer bar or rod may be set towards the bottom to keep softly tensioned lines spaced. Said rod may be negatively buoyant to provide downward tension from a surface buoyant or stilted structure, or positively buoyant at the surface as the support structure to a negatively weighted system, or positively buoyant set mid-water over benthic-anchored line, wire or rod systems.

FIG. 10 is an illustration of an exemplary rigid frame nursery system to support adjustable or permanently tensioned lines, wires or rods, or a taught meshwork thereof. In this embodiment, a plurality of tensioned lines 1002 are each set with a plurality of ring mount assemblies 1001 and secured into a rigid frame 1003 elevated above the seafloor upon supporting legs 1004 or buoyed midwater beneath floats 1005. Alternative embodiments may attach the ring mount 1001 first, with the (coral) propagule set afterwards, or to incorporate the propagule within the line-ring mount loop directly and forgo the tie. Further embodiments may employ a fabricated line with affixed ring mounts, as per FIG. 4. Further embodiments may employ a pre-tightened line, wire, rigid rod or mesh 1002 and affix the ring mount to said taught or rigid structure with a secondary wire, line or tie. In further and various embodiments, the structural frame may be oriented vertically, horizontally or in other orientations supported by legs, midwater floats, surface floats or other support structures. Further embodiments may be employed within tank or raceway cultures outside of the sea. In some embodiments, a plurality of frames may be erected atop one another on spacer-legs or beneath buoys.

In a preferred embodiment, the frame 1003 may be arranged vertically to reduce the number of support legs or buoys required. However, in other embodiments, frame 1003 may be supported in any orientation.

A support frame may hold tensioned lines, wires, rods or meshes of various attachment devices and embodiments and species.

In some embodiments, the rectangular (or similar) rigid frame 1003 may be replaced by two end-bars held taught by positive or negative buoyancy or braced on the seafloor, with the nursery lines 1002 held taught between these bars. In further embodiments, a spring, elasticated line or similar may also be employed to provide tension, as may a buoy or mass applied to the 1002 line and passing around the frame 1003.

In some embodiments, the one or more lines, wires or rods 1002 may be attached to the frame 1003 with, for example, an adjustable or tightening knot around the frame structure or clip to such a knot or, for example, via a tightening device such as a turnbuckle, thread-nut assembly or similar.

In some embodiments, frame 1003 may provide suspend, via positive or negative buoyancy, live source coral material and a ring mount-coral assemblies not yet set to lines within the frame 1002, or lines under construction.

FIGS. 11A, 11B, 11C, and 11D are illustrations for the setting of ring mounts to larger corals for relocation and planting. In the initial example, a larger coral established to a stable (wild reef) substrate 1101 has ring mounts 1103 attached to one or several of its mature branches 1102. Once the ring mounts are overgrown and secured within the coral tissue and skeleton 1104, the branch is cut from the parent coral at a point below the ring mount 1105, providing the practitioner with a large coral with a solid base-point for securing to the seafloor elsewhere 1113. The remainder of parent coral heals the cut lesion and may be left to continue to grow in place.

In the second illustrative example of this embodiment of the invention, a large coral is in drop-attachment nursery culture 1106, suspended from a support line or rod 1107 by its drop-line 1108 and having partially overgrown this drop-line 1109. Ring mounts are set to this established coral adjacent to the drop-line attachment point 1110. Specific variations defined above may be employed per the corals morphology or intended planting such as a stabilizing extension to the ring mount 1110a. Once the ring mounts are overgrown and secured within the coral tissue and skeleton 1111, the branch is cut from the established nursery coral 1112 for planting to the seabed. In this embodiment, several such planting units may be collected to leave the central drop-line attachment point for healing and regrowth within said nursery.

In the third illustrative example, the larger coral colony 1113 is able to be firmly and quickly secured 1118 to the substrate 1114 via its pre-incorporated and stabilized ring mount 1116 and a screw 1117, as per FIG. 5, without the requisite labor/time investments of tie-down methods nor the time and live tissue losses of cements and adhesives. As secured with live tissue in direct contact with the hard substrate and without further injury 1115, the coral may quickly overgrow said substrate 1121 for full and permanent establishment 1120.

FIGS. 12A, 12B, and 12C illustrate several elevating mount embodiments of the invention, providing one or a plurality of male elevators, one for each female ring mount-coral assembly. A table or perforated or mesh frame 1201 of an undersea benthic or buoyant mid-water nursery, or of tank or raceway culture outside of the sea, in one embodiment supports a conical elevator 1201. The ring mount-coral assembly 1203 is then set over this cone with the propagule suspended with minimal hindrance 1204. Another embodiment is a threaded male rod 1205 with a threaded or elasticated stopper or nut at a lower point appropriate to the intended size of the coral propagule 1206. The ring mount-coral assembly is then set over the threaded rod to rest atop the stopper, and secured into place with an upper nut or stopper 1208. Some further embodiments include a structure with a permanent lower stopper for the shape of a lower-case T 1209. The ring mount-coral assembly ring is set over the top of the T to rest atop the lower stopper bar 1211 and is secured with a clip or small O-ring 1201. Further embodiments of the invention provide a clip that secures the ring portion of the ring mount assembly 1212, holding the propagule inverted in the ring mount assembly 2013 and elevated receptacle 1214 for a projection to the ring mount 1215 to again hold the propagule securely inverted 1216. Mounting embodiments not illustrated include vertical suspension of the mesh or table nursery device or setting of such mounts to a taught or vertically suspended line or rod.

Operation

In a preferred embodiment, the technician sets the nursery line support frame 1103 into the sea in the general area of works, and loosely drapes a prepared line to this frame. The line is of a flexible non-stretching material (Spectra™, for example) of a relatively high strength (more-than 801*b* test), prepared with stainless steel spinners at the two ends and marked at increments appropriate to the size and morphology of the intended coral species and intended growth duration. The line is somewhat longer than the length of the frame to account for length used in through-wrapping the ring mount. An antifoulant treatment on the line and the frame is optional.

The technician then sources an appropriate parent or donor coral with a bag containing a known count of empty ring mounts 101, each pre-prepared with attachment wire segments 102. The ring mount or the attachment wire may be of a parent-indicator color. Small (coral) propagule fragments 103 are clipped from the source-coral with side-cut pliers and each is immediately secured to its own ring mount as ring mount assemblies 106 and placed into a bag. The attachment should be tight enough that the propagule does not move against or around the ring mount. As such, the ring mount may be roughened, textured or with a flattened face in some embodiments as traction. Setting a known number of ring mount assemblies according to the number of marked wrap points on the support line precludes excessive harvest impact on the parent coral and related waste of coral material. Assuming adequate and appropriately presented parent material and water stillness, an experienced technician on SCUBA can set fifty (50) ring mount-coral assemblies may be bagged in 30 minutes; massive, mounding and pillar coral morphologies are more time-consuming than plating and branching species, including fire and soft-corals and sponges. The technician then carries the bag of coral mount assemblies to the location of the nursery frame and prepared support line.

At the nursery, the technician makes a small loop the prepared, draped line and pushes said loop through the ring mount, then bring the loop around the ring mount assembly. The technician then applies some tension to the line to secure the loop into the line. The technician may manually adjust the loops to their most appropriate or secure position on the ring mount prior to applying full tension. According to experimentation, this process takes approximately twenty (20) seconds per ring mount assembly. The technician then fills the remaining marked points on the line with the ring mount assemblies from the bag.

The technician then wraps a length of strong line (100 Lb nylon monofilament, for example) through in a full wrap of the nursery frame's bar and through the loop of one of the nursery line's end-spinners to connect the ends of the attachment line with a modified cinch knot. This occurs at both end of the nursery line to set it loosely into the frame, after which the cinch knots are tightened against the frame bar to draw the nursery line taught. Tightening of the line fully secures the ring mounts into their positions in the line. Subsequent lines are set similarly, spaced according to the intended working and final sizes of the nursery corals.

The technician maintains the system by keeping the lines taught and overall system clean of flotsam and fouling organisms. In initial days to weeks, the propagule heals and begins to overgrow the ring mount and attachment line, including the twists, knots or catches thereof, making permanent the connections of the ring mount-coral assembly within the tissues and skeleton. Over subsequent weeks to months the suspended corals continue to grow to an outplanting size according to programmatic goals or processes.

In planting, a general reef location is chosen by the technician and/or technical team according to programmatic and logistical parameters. The technician then removes an established line of appropriately matured ring mount assemblies/planting units from the nursery frame and, on the seafloor adjacent to the nursery, the planting unit is detached from the support line by loosening tension and unwrapping the connecting loop or by cutting the line and/or line-ring connection and carefully sets them into a transport box or bag. The bag is then transported to the planting site. Alternatively, one end of the line may be set to a small buoy and the line with corals swum to the intended planting site. Further embodiments may wrap the line with corals in place around a core for transportation to the planting site. In such an embodiment, the line with corals may be re-set to a further support system in a vertical or horizontal orientation at or near to the planting site for a period of time in order to adapt to the planting site conditions prior to planting to the seafloor, or simply as safe-storage while planting occurs from said line.

At the planting site the technician chooses planting locations at fine and per-coral scales, usually based on specific cleanliness and elevation of specific points of reef. Theoretically, corals are best planted to elevated locations that are relatively clean of macroalgae and sediment; such fine scales and locations are available to various embodiments of this invention and method. Once a planting point is chosen, the technician drills a hole 506 appropriate to the size of the ring mount and its masonry screw 504. The drill will be appropriate to underwater applications: a battery-operated sealed electric unit, pneumatic or hydraulic drive. Once a hole is drilled into stable substrate, then the ring of the planting unit is set over said hole in such a way that the coral is best anchored for the morphology, size and location, and a masonry screw set through the ring and into the drilled hole. The masonry screw is then screwed into the hole 507, 1118, either by powered drill or by hand screwdriver, until the coral tissue is securely in contact with solid substrate and does not move with a light tap 509. The technician then moves to the next planting-point with the next coral until the bag or suspended storage line is exhausted. In shallow water an experienced technician may perform this work on snorkel or breath-hold; however, in deeper water this work requires SCUBA or similarly supplied breathing air. An experienced technician with uniformly solid substrate, calm sea conditions and a good drill may comfortably set one ring mount-coral assembly per minute, thus at least sixty (60) corals per hour. At sites of crustose calcareous algae forming holes in the reef the technician need not drill holes, greatly accelerating planting speeds. Although rougher sea conditions may slow planting rates, secure planting may continue through such days, as the time for cements or adhesives to cure is not required.

Over subsequent weeks, the secured corals will overgrow the underlying substrate and the screw head. The technician checks them periodically to ensure that this is happening and, where it is not, the screw may be further tightened or secondary branch wedging, monofilament tie-down or cements/adhesives may be applied.

Exemplary Embodiments

In some embodiments, the propagule may be inserted into the ring mount to tensioned line attachment loop at 203, forgoing the need for a line or wire wrap attachment.

In some embodiments, the tensioned line, wire or rod may be passed through the ring mount and the ring mount-coral assembly secured thereto with a tie, wire, adhesive or similar.

In some embodiments, the ring mounts may be set to the line, wire or rod and propagules set thereto afterwards.

In some embodiments, the ring mount-coral assembly may be attached to the line, wire or rod with a short segment of line, suspending them below the main line.

In some embodiments, one or a plurality of ring mount assemblies may be set to by a single segment of line suspended from a benthic, floating or mid-water buoyed framework.

In some embodiments, clips or clasps, including those with integrated spinners, may be used at the line ends to accelerate and simplify setup and adjustment.

In some embodiments, a predator dam may comprise a flat disc or conical device set within the line, wire or rod or the frame anchor line or elevator leg that inhibits along-line access by crawling corallivors (coral and polyp-eating) including starfish, snails and worms.

In some embodiments, a plurality of shock-absorbers, for example, rubber, spring, drop-weight, hydrodynamic or other shock-absorbent inserts may be set into the line at its tie or anchoring portion to minimize shock-stresses with storms or collision.

In some embodiments, lines may comprise non-stretching braided or fluorocarbon filament. In some embodiments, lines may comprise a substrate attachment line segment of 200 lb breaking strength of braided fishing line, carbon fiber line or fluorocarbon monofilament and may further comprise clips and swivels at the substratum/anchor of similar strength rating.

In some embodiments, frames, line, swivels, clips, turnbuckles, floats and masses may be set with antifouling treatments (for example, antifouling paints) as necessary.

In some embodiments, the ring mount may be fabricated with a clip, loop, line, wire or tie or similar element for attachment to the support line, wire, rod or framework incorporated therein.

Reference numerals used in the figures are as follows:

| FIG. Label | Figure Item Name/Description |
|---|---|
| FIG. 1 | The ring mount assembly |
| 101 | A ring mount. |
| 102 | A segment of line or wire, or a fine cable tie. |
| 103 | A (coral) propagule: a living portion of the nursery-target organism intended for nursery culture and propagation. |
| 104 | A propagule set against a ring mount for securing with a tie, wire or line. |
| 105 | Wrapping the propagule to the ring mount using the segment of line, wire or tie. |
| 106 | A knot, tie ratchet or wire twist tightly securing the (coral) propagule and ring mount, to be termed a Ring Mount Assembly or Planting Unit |

-continued

| FIG. Label | Figure Item Name/Description |
|---|---|
| FIG. 2 | Ring mount (assembly) attachment to a midwater support line. |
| 201 | Draped, loosely tensioned or adjustably tensioned line. |
| 202 | Passing a loop of the tensioned line through the ring mount and around the ring mount assembly. |
| 203 | A tightened and adjusted loop around the ring mount assembly, securing the assembly into the tensioned line. |
| 204 | A tensioned line securely holding the ring mount assembly. |
| FIG. 3 | Ring mount attachment to midwater support tensioned line, wire, rod or frame |
| 301 | Permanently tensioned line, wire or rigid rod. |
| 302 | A wrap of tie, wire or line segment wrapping through the ring mount assembly and around the tensioned line, wire or rod. |
| 303 | A tightened wrap of tie, wire or line around the supporting tensioned line, wire or rod to secure the ring mount assembly into a location in the line, wire or rod. |
| 304 | A tightened line knot, ratchet or twisted wire securing the ring mount-coral assembly into the line, wire or rod. |
| FIG. 4 | Pre-prepared ring mount |
| 401 | A pre-set (coral) propagule attachment line of the fabricated ring mount. |
| 402 | A one-way tightening tapered or ratcheted groove or perforation in the fabricated ring mount |
| 403 | A (coral) propagule held against a fabricated ring mount |
| 404 | The attachment line of the fabricated ring mount wrapping around the (coral) propagule |
| 405 | the attachment line of the fabricated ring mount being passed through the tightening tapered or ratcheted groove or perforation |
| 406 | The attachment line of the fabricated ring mount being drawn through the one-way tightening groove/perforation to tighten permanently and secure the (coral) propagule to the fabricated ring mount to form a ring mount-coral assembly. |
| 407 | the tightened line securing the (coral) propagule to the fabricated ring mount as a ring mount-coral assembly |
| 408 | the remaining "tail" length of the attachment line, clipped short once the (coral) propagule is secure. |
| 409 | A fabricated ring mount nursery line with ring mounts fabricated therein. |
| 410 | A plurality of fabricated ring mounts set to a fabricated line at regular intervals |
| 411 | A hook and/or clip assembly as fabricated into the ring mount |
| 412 | A hook and/or clip closure gap into which the tensioned support line fits |
| 413 | A tensioned line, wire, rod or frame |
| 414 | A hook and/or clip assembly closed securely over the tensioned line, wire, rod or frame element. |
| 415 | A ring mount assembly in healing and growth position, as clipped securely to the tensioned line, wire, rod or frame element |
| FIG. 5 | Out-planting the ring mount |
| 501 | An established ring mount assembly or (coral) planting unit ready for planting |
| 502 | The action of removal of the ring mount from its supporting line, wire or rod by unlooping, cutting, unclipping or untying. |
| 503 | The supporting line, wire or rod from which the mature ring mount assembly is being removed. |
| 504 | A masonry screw of head slightly wider than the internal diameter of the ring mount. |
| 505 | The planting substrate, in this case the seabed. |
| 506 | A hole drilled into the substrate |
| 507 | Threading the screw through the ring mount and screwing the screw into the hole in the substrate. |
| 508 | The screw head, tightly securing the ring mount assembly to the substrate. |
| 509 | The ring mount as a washer, secured to the planted substrate by the screw. |
| 510 | The tissue of the planted coral held securely in contact with the substrate. |
| 511 | Eventual overgrowth by the planted coral of the screw head, ring mount and substrate, including further growth, as is the intention of some embodiments of the invention. |
| FIG. 6A-6B | Ring mounts with clasping and stabilizing variations |
| 601 | A ring mount fabricated with variation |
| 602 | A pair of fabricated spring pincers intended to grip the (coral) propagule. |
| 603 | The propagule intended for culture |
| 604 | The ring mount with fabricated pincers (variation) clasping the coral propagule as ring mount assembly. |
| 605 | A fabricated line extending from one of the pincer arms. |
| 606 | A one-way tightening tapered or ratchetting through-passage or grove in one of the pincer arms. |
| 607 | The pincer arms wrapping the propagule while the line passes through the one-way tightening device to secure the arms around the propagule as the ring mount assembly. |
| 608 | A rigid stabilizing perpendicular pillar variation incorporated into the fabricated ring mount emanating from the ring mount in two directions |
| 609 | The edge of the ring mount and length of the rigid shaft set firmly against the coral propagule and secured with a wire, line or tie. |
| 610 | A rigid stabilizing perpendicular pillar variation incorporated into the fabricated ring mount emanating in only one direction from the ring mount. |
| 611 | A short "foot" rigid stabilizing pillar variation incorporated into the fabricated ring mount emanating in parallel from the ring mount. |
| 612 | A propagule of intention to grow in a single "upwards" direction perpendicular to the ring mount. |
| 613 | A ring mount assembly variation wherein the longer single-direction linear propagule is held by the wire, tie or line atop the ring mount's parallel foot and along and in contact with the perpendicular stabilizing pillar as ring mount assembly. |
| FIG. 7 | Upright grip mount for ring mount. |
| 701 | A base-plate for upright grip mount attachment to ring mount. |
| 702 | One to several barbed holding stalks. |
| 703 | The propagule intended for securing in culture. |
| 704 | The action of pressing the propagule between the holding stalks until held in contact with base plate. |
| 705 | The propagule held secure within the barbed holding stalks against the base plate as the ring mount assembly. |
| 706 | A securing line incorporated into an upright grip mount for the ring mount. |
| 707 | A one-way tightening tapered or ratcheted groove or perforation in the upright grip mount. |
| 708 | The securing line wrapping around the propagule and holding stalks. |
| 709 | The securing line running through the one-way tightening tapered or ratcheted groove or perforation to tighten, securing the base plate, propagule and holding stalks together as the ring mount assembly. |
| 710 | A mature upright grip ring mount assembly prepared for planting, having overgrowth the stalks, base plate and a portion of the ring mount. |
| FIG. 8 | Settled recruit button mount as ring mount variation |
| 801 | A coral larvae settlement snap. |
| 802 | The through-hole of the larvae settlement snap. |
| 803 | A settled (coral) larvae or microfragment propagule. |
| 804 | A fabricated securing line wrapping the settlement snap and ring mount. |
| 805 | The securing line passing through a one-way tightening perforation. |
| 806 | The securing line being pulled tight through the one-way tightening perforation to secure the button (with settled larvae or propagule) to the ring mount. |
| 807 | The remainder tail of the tightened securing line cut away. |
| 808 | The settlement snap secured tightly to the ring mount as ring mount assembly. |
| 809 | A button for a settlement snap variation incorporated into a ring mount. |

-continued

| FIG. Label | Figure Item Name/Description |
|---|---|
| 810 | A larvae settlement snap being pressed over the ring mount button until secure |
| 811 | A ring mount button-secured snap and juvenile coral as ring mount assembly. |
| 812 | The through-snap pressed ring mount button visible on the opposite side of the snap, indicating secure attachment for larvae or propagule growth. |
| 813 | An established recruit or propagule, having overgrown the snap, button and portion of the ring mount, ready to be planted. |
| FIG. 9 | Soft-tensioned support system for ring mount (coral) nursery culture. |
| 901 | A midwater float. |
| 902 | A support line, wire or rod. |
| 903 | A ring mount assembly attachment point to the support line, wire or rod. |
| 904 | A ring mount assembly held at and supported by the line, wire or rod. |
| 905 | A benthic anchor for the buoyant tensioned line or supported wire or rod. |
| 906 | The substrate or seabed. |
| 907 | The sea surface. |
| 908 | A surface buoy. |
| 909 | A tensioning mass beneath the surface buoy. |
| FIG. 10 | Hard tensioned support system for ring mount nursery culture |
| 1001 | A ring mount assembly supported on its line, wire, rod or frame. |
| 1002 | A line, wire, rod or frame held rigid within a primary structural frame. |
| 1003 | A rigid primary structural frame. |
| 1004 | A supportive leg for a frame elevated from the seafloor, as a table |
| 1005 | A supportive buoy for a frame elevated to mid-water between buoys and anchors. |
| FIG. 11A, 11B, 11C, and11D | Ring mounts set to larger and established corals. |
| 1101 | A large wild coral on the reef to be relocated in fragments. |
| 1102 | An established coral branch intended to be relocated. |
| 1103 | A ring mount attached to an established coral branch as ring mount assembly or planting unit |
| 1104 | A ring mount attached to, and overgrown by, a larger coral branch in preparation for harvest, a planting unit. |
| 1105 | The action of cutting or fracturing the coral branch below the overgrown ring mount in harvest as a planting unit. |
| 1106 | A large nursery coral on a drop-line type elevating coral nursery intended to be planted. |
| 1107 | A support structure of an elevated or midwater coral nursery. |
| 1108 | The drop-line attachment of an elevated or midwater coral nursery. |
| 1109 | The overgrowth of the drop-line of a mature coral under nursery culture. |
| 1110 | A ring mount attached to an established coral branch under nursery culture as a planting unit |
| 1110a | A ring mount with the perpendicular stabilizing pillar (610) attached to an established coral branch under nursery culture as a planting unit. |
| 1111 | A ring mount with or without perpendicular pillar overgrown by the coral branch in the nursery as a planting unit prepared for planting. |
| 1112 | The action of cutting or fracturing the planting unit at a point immediately below the overgrown ring mount. |
| 1113 | A large, intact coral branch in place to be planted to the planting substrate. |
| 1114 | The hard planting substrate, in this case the seafloor. |
| 1115 | The cut base of the coral branch in contact with the seafloor in preparation for securing. |
| 1116 | The ring mount set to the seabed in preparation for securing. |
| 1117 | A masonry screw to be used to secure the large planting unit coral to the seabed. |

-continued

| FIG. Label | Figure Item Name/Description |
|---|---|
| 1118 | A hole drilled in the seabed to accept the masonry screw via the ring mount, as a washer, to secure the planting unit to the seabed. |
| 1119 | A large coral planted to and established on the seabed. |
| 1120 | The ring mount, screw and surrounding seabed overgrown by the fully established planted coral. |
| FIG. 12A, 12B, and 12C | Ring mounts on supporting bases under table or ex situ raceway and tank culture. |
| 1201 | A base for the elevated male support as a table, tray, frame or similar. |
| 1202 | A vertical cone elevator. |
| 1203 | A ring mount assembly. |
| 1204 | A ring mount assembly passed over the cone until securely elevated above the base. |
| 1205 | A threaded vertical elevator in a vertical configuration. |
| 1206 | A lower threaded elevating nut or rubber ring on the threaded elevator. |
| 1207 | A threaded nut or rubber ring. |
| 1208 | The ring mount assembly held aloft between the lower and upper threaded nuts or rubber rings on the vertical elevator. |
| 1209 | An elevator with a permanent lower stop-point in a vertical orientation |
| 1210 | A tightly-fitting rubber ring. |
| 1211 | A ring mount assembly held securely aloft between the lower permanent elevating stop-point and the upper rubber ring. |
| 1212 | An elevator with a semi-enclosed ring holding device at its top. |
| 1213 | A ring mount assembly held securely inverted and above the base in the semi-enclosed holding device. |
| 1214 | A ring mount including a pin device opposite the coral attachment line, exemplified as an inverted ring mount assembly. The pin device may be the tensioned line clip (414) |
| 1215 | An elevator with a holding device for the ring mount pin. |
| 1216 | A ring mount assembly with mounting pin secured to the elevator's pin holding device, holding the ring mount assembly inverted above the base. |

General Considerations

Coral material for nursery culture is often rare on the wild reef, thus of high-value necessitating high-survivorship.

Setting coral propagules to in situ (in the sea) nursery culture is time consuming including high-cost boat and SCUBA diver time.

Most nursery designs of the current state-of-the-art generate a product coral that has grown in several directions, thus is not readily planted to a planar substrate.

Most nursery and planting systems of the current state-of-the-art rely on adhesives and cements. Tissue covered by these materials is lost, and the time to curing allows for losses to inclement seas and faunal damage.

Most planting processes in the state of the art do not allow planting during any but the calmest sea conditions, particularly of larger corals.

Most nursery designs of the current state-of-the-art have discrete nursery growth and planting stages and/or mechanisms and processes with little integration.

Most in situ coral nursery designs are not moveable for pending storm nor bleaching.

Out-planting of nursery grown material is laborious, usually requiring SCUBA.

Larger corals fare better on the wild reef, though larger corals are not necessarily available from nursery culture.

With targeted per-coral placement, survivorship of out-plants may be greatly improved.

Benefits to the Above Described Tensioned-Line Systems Over Current State of the Art:

Nursery mount and substrate (planting) mount within the same ring mount device.

Allows for use of screws in planting the coral, as the ring mount acts as a washer with the coral securely attached and overgrowing.

Direct, mechanical securing to seafloor allows secure, upright planting of larger corals.

Coral is secure immediately, without waiting for adhesives or cements to cure.

Corals may be planted securely under relatively rough sea conditions.

Planting is per-coral discrete, without requiring efficiencies of patch-planted rosettes as with cement.

Readily available parts in its most basic embodiments.

Coral propagules may be set to a known number of ring mounts at harvest, eliminating overharvest waste.

Rapid deployment underwater in setting propagules to ring mounts and ring mount assemblies to support nursery.

Ring mount assemblies may be removed or relocated within the line or system with minimal stress to the coral.

No requirement for removal of fragments from seawater, minimizing stress.

High survivorship of small propagules (>95%) to 6 months in experimentation.

Vertically orientated nurseries provide full mechanical advantage to the support buoy throughout growth & harvest cycles.

In situ frame or ex situ raceway allows large numbers of propagules to be grown in a small, discrete area.

Ring mount assemblies may be relocated between in situ and ex situ culture and vice versa with minimal stress to the propagule either as individuals or as nursery elements/portions.

Horizontal frame allows uniform and maximum light exposure to all isolates in culture, suggesting maximized growth rates.

Offers greatly improved planting efficiencies to other, possibly more productive coral nursery methods, including capacity for partial harvest leaving remainders in the nursery to continue to grow.

System may be easily elevated, sunk or relocated in their entireties for bleaching/hardening, storms, experimentation etc.

Improved survivorship with targeted per-coral planting placement allows much smaller out-plants with little increase in mortality.

Smaller propagules reduce the impact to the parent coral, while smaller out-plants allows for greater coverage of the seafloor in species and/or ecosystem enhancement or restoration under silvicultural themes.

An embodiment of this invention is also applicable to ex situ culture in land-based tanks or raceways, including for aquarium industry sale.

The skilled person will be aware of a range of possible modifications of the various embodiments described above.

What is claimed is:

1. A method of securing a coral propagule into a nursery structure, comprising the steps of:
   securing the coral propagule directly to an outer surface of a ring mount device; and
   securing the ring mount device into an elevating coral nursery system to heal and grow coral, wherein the ring mount device is operable to be overgrown, by the coral, to permanently secure it into the coral propagule's tissues or skeleton, or both of the coral propagule's tissues and skeleton;
   removing the ring mount device with overgrown by the coral from the elevating coral nursery system; and
   through-inserting a male fastener through the ring mount device, wherein the ring mount device is physically secured to a natural or artificial substrate.

2. The method of claim 1, further comprising adding a coral-securing wire, line, or tie to the ring mount device.

3. The method of claim 1, wherein the ring mount device is configured to anchor the coral propagule based on:
   a predetermined coral propagule size, morphology, or nursery structure; and
   planting location or conditions.

4. The method of claim 1, wherein the ring mount device comprises a wire, a line, a clip, or a clamp addition for securing it into the nursery structure.

* * * * *